United States Patent
Cimpu et al.

(10) Patent No.: US 12,543,091 B2
(45) Date of Patent: Feb. 3, 2026

(54) IMPROVING COEXISTENCE USING VIRTUAL NON-PUBLIC NETWORK FENCING IN MACRO PUBLIC NETWORKS

(71) Applicant: Telefonaktiebolaget LM Ericsson (PUBL), Stockholm (SE)

(72) Inventors: Virgil Cimpu, Ottawa (CA); Mats Buchmayer, Enskede Gard (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 573 days.

(21) Appl. No.: 17/782,227

(22) PCT Filed: Dec. 17, 2020

(86) PCT No.: PCT/SE2020/051226
§ 371 (c)(1),
(2) Date: Jun. 3, 2022

(87) PCT Pub. No.: WO2021/126065
PCT Pub. Date: Jun. 24, 2021

(65) Prior Publication Data
US 2023/0008485 A1    Jan. 12, 2023

Related U.S. Application Data

(60) Provisional application No. 62/951,435, filed on Dec. 20, 2019.

(51) Int. Cl.
*H04W 36/30* (2009.01)
*H04W 36/22* (2009.01)

(52) U.S. Cl.
CPC ......... *H04W 36/305* (2018.08); *H04W 36/22* (2013.01)

(58) Field of Classification Search
CPC ... H04W 36/22; H04W 36/305; H04W 36/14; H04W 84/045; H04W 28/08
USPC .......................................................... 455/436
See application file for complete search history.

(56) References Cited

U.S. PATENT DOCUMENTS

| | | | |
|---|---|---|---|
| 2015/0281966 A1 | 10/2015 | Griot et al. | |
| 2015/0373597 A1* | 12/2015 | Kim | H04W 36/0016 455/436 |
| 2017/0164349 A1 | 6/2017 | Zhu et al. | |
| 2017/0367022 A1* | 12/2017 | Chandrasekaran | H04W 28/0284 |

FOREIGN PATENT DOCUMENTS

WO    2018 125686 A2    7/2018

OTHER PUBLICATIONS

3GPP TR 23.745 v0.4.0; Technical Report; 3rd Generation Partnership Project; Technical Specification Group Services and System Aspects; Study on application layer support for Factories of the Future in 5G network; (Release 17)—Jul. 2019.

(Continued)

*Primary Examiner* — Huy C Ho
(74) *Attorney, Agent, or Firm* — Baker Botts L.L.P.

(57) ABSTRACT

A method performed by a first network node associated with a public network in a first cell includes determining that a first wireless device operating on a first frequency band in the first cell is proximate to a second cell associated with a non-public network operating on a second frequency band. The first network node offloads the first wireless device to a third frequency band.

23 Claims, 17 Drawing Sheets

(56) References Cited

OTHER PUBLICATIONS

3GPP TSG RAN WG2 Meeting #105; Athens, Greece; Source: Intel Corporation; Title: RAN2 impact on Non-Public Network Deployment using SNPN (R2-1900760)—Feb. 25-Mar. 1, 2019.

PCT International Search Report issued for International application No. PCT/SE2020/051226—May 10, 2021.

PCT Written Opinion of the International Searching Authority issued by International application No. PCT/SE2020/051226—May 10, 2021.

EPO Communication Pursuant To Article 94(3) EPC issued for Application No. 20 828 574.2-1215—Aug. 7, 2024.

* cited by examiner

IMPROVING COEXISTENCE USING VIRTUAL NON-PUBLIC NETWORK FENCING IN MACRO PUBLIC NETWORKS

PRIORITY

This nonprovisional application is a U.S. National Stage Filing under 35 U.S.C. § 371 of International Patent Application Serial No. PCT/SE2020/051226 filed Dec. 17, 2020 and entitled "Improving Coexistence Using Virtual Non-Public Network Fencing in Macro Public Networks" which claims priority to U.S. Provisional Patent Application No. 62/951,435 filed Dec. 20, 2019 both of which are hereby incorporated by reference in their entirety.

TECHNICAL FIELD

The present disclosure relates, in general, to wireless communications and, more particularly, systems and methods for improving coexistence using virtual non-public network (NPN) fencing in macro public networks (PNs).

BACKGROUND

3GPP is currently working on the specification of what is commonly known as 5G. In this effort, use cases to support what is called non-public networks (NPNs) have been identified and 3GPP has defined a number of different work items to specify the support of NPN.

An NPN is typically a network that provides 5G network services to a clearly defined user organization or group of organizations such as, for example, a closed set of users in a factory or industrial deployment. There are two alternative versions to support NPN currently being specified, Public Network-Integrated NPN (PNI-NPN) and Stand Alone NPN (SNPN).

In the PNI-NPN solution, an operator may use its own Public Land Mobile Network identifier (PLMN-id) to also integrate an NPN.

In the SNPN solution a non-public network is able to use a PLMN-id that is shared among several deployments as well as unique PLMN-id, but in this scenario the PLMN-id is coupled with a NID. The NID may be locally assigned or globally unique.

Common to the NPN solutions are that the NPN will be deployed on a separate frequency from the Macro public network. As used herein, the Macro public network may also be simply referred to as a public network (PN). The reason is the closed subscription of an NPN that will cause interference other users in PN if deployed co-channel. However, on separate, or adjacent channels, the interference should be manageable.

Certain problems exist, however. For example, assuming that an NPN is deployed indoor, the users of the outdoor PN network as well as the indoor users of the NPN network are relatively protected from each other. Good service quality in both networks can be maintained as long wall loss is sufficiently large to isolate the deployments. However, one co-existence issue that still needs to be mitigated, even when the NPN is deployed on adjacent channel, is the interference between a UE that is attached to the PN but is operating indoors within the NPN proximity and the NPN network. The interference caused by the UE attached to the PN may interfere with both the UE attached to the NPN and the base station (BS) depending on the synchronization applied. Likewise, the UE attached to the NPN or BS may interfere with the UE attached to the PN. As used herein, a UE attached to the NPN may be referred to as a NPN UE, and a UE attached to the PN may be referred to as a PN UE or a macro UE.

FIG. 1 illustrates an example near-far interference scenario. More specifically, FIG. 1 illustrates the coexistence issue created by the near-far scenario, where the PN UE1 inside an example factory has to transmit at high power level to be able to reach its serving gNB1, while at the same time generating high interference towards the indoor gNB2 and its NPN UEs operating at lower power levels.

SUMMARY

Certain aspects of the present disclosure and their embodiments may provide solutions to these or other challenges. For example, according to various embodiments, methods, systems and techniques are proposed to improve coexistence between Non-Public Networks (NPN) and Macro Public Networks (PN) sharing the same band. Certain embodiments may allow the PN to identify the NPNs operating in the same shared band as some of the macro cells and to create the equivalent of a virtual fence around an NPN deployment (i.e., NPN cell(s)).

According to certain embodiments, a method by a first network node associated with a public network in a first cell includes determining that a first wireless device operating on a first frequency band in the first cell is proximate to a second cell associated with a non-public network operating on a second frequency band. The first network node offloads the first wireless device to a third frequency band.

According to certain embodiments, a first network node associated with a public network in a first cell includes processing circuitry configured to determine that a first wireless device operating on a first frequency band in the first cell is proximate to a second cell associated with a non-public network operating on a second frequency band. The processing circuitry is configured to offload the first wireless device to a third frequency band.

According to certain embodiments, a method by a wireless device is performed during a handover of the wireless device from a first cell associated with a non-public network to a second cell associated with a public network. The method includes transmitting, to a network node associated with the public network, information associated with the non-public network.

According to certain embodiments, a wireless device includes processing circuitry configured to transmit, to a network node associated with a public network, information associated with a non-public network during a handover of the wireless device from a first cell associated the non-public network to a second cell associated with the public network.

Certain embodiments may provide one or more of the following technical advantages. For example, one technical advantage may be that certain embodiments allow the PN to identify the NPN cells operating in the same shared band as some of the macro cells and to create the equivalent of a virtual fence around the NPNs that will restrict PN wireless devices from using a frequency close to the frequency of the NPN.

As another example, a technical advantage may that, according to certain embodiments, PN UEs operating within the close proximity to NPN will be able to do so without loss of performance as well as without injecting interference to the NPN, allowing for a mutual-beneficial co-existence scenario.

As another example, a technical advantage may be that certain embodiments use something similar to the Closed Subscriber Group concept in Evolved Universal Terrestrial Radio Access Network (E-UTRAN) to limit access to the NPN.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
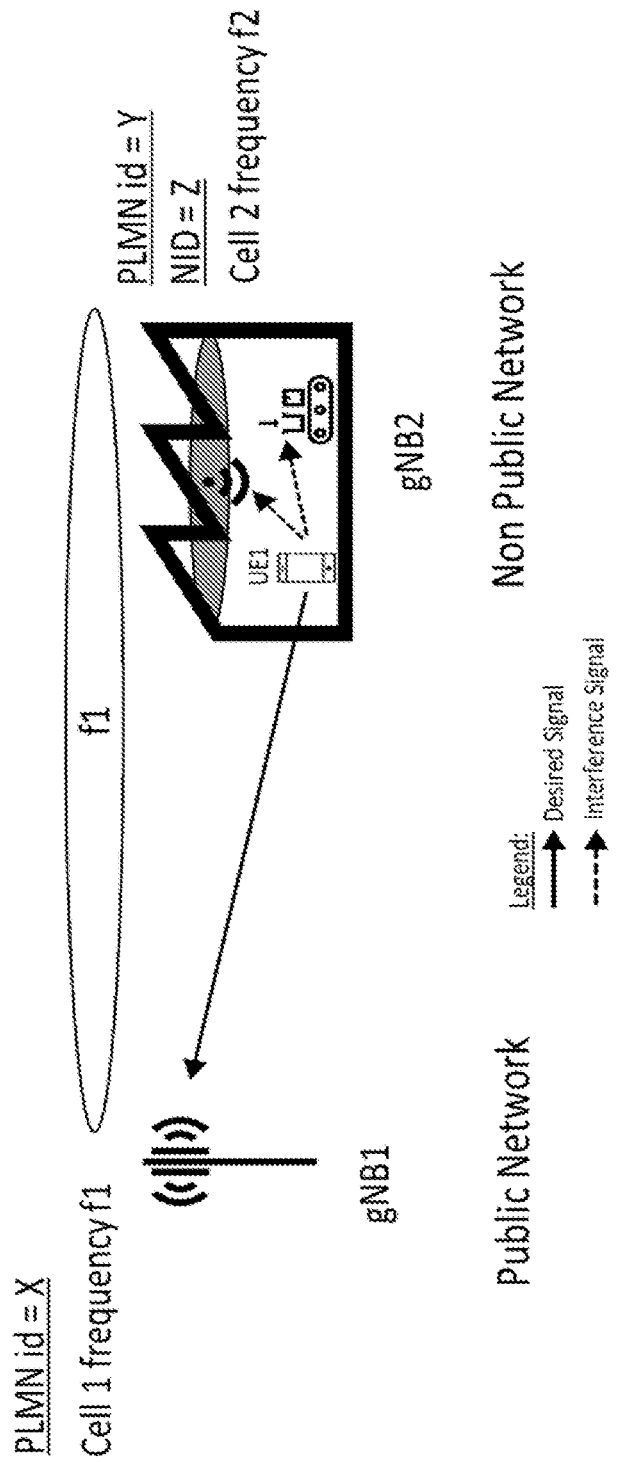
FIG. 1 illustrates an example near-far interference scenario.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a user equipment (UE) (directly or via another node) and/or with another network node. Examples of network nodes are NodeB, a network node belonging to master cell group (MCG) or secondary cell group (SCG), base station (BS), multi-standard radio (MSR) radio node such as MSR BS, eNodeB (eNB), gNodeB (gNB), Master eNB (MeNB), Secondary eNB (SeNB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g. Mobile Switching Center (MSC), Mobility Management Entity (MME), etc.), Operations & Maintenance (O&M), Operations Support System (OSS), Self-Optimizing Network (SON), positioning node (e.g. Evolved Serving Mobile Location Center (E-SMLC)), Minimization of Drive Tests (MDT), test equipment (physical node or software), etc.

In some embodiments, the non-limiting term UE or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Unified Serial Bus (USB) dongles, UE category M1, UE category M2, Proximity Services UE (ProSe UE), Vehicle-to-Vehicle UE (V2V UE), Vehicle-to-Anything UE (V2X UE), etc.

Additionally, terminologies such as BS/gNB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB or UE.

According to certain embodiments, various methods, systems, and techniques are proposed to improve coexistence between Non-Public Networks (NPN) and Macro Public Networks (PN) sharing the same band. The goal is to allow the PN to identify the NPNs operating in the same shared band as some of the macro cells and to create the equivalent of a virtual fence around an NPN deployment (i.e., NPN cell(s)) that will prevent the UEs attached to the PN (PN UEs), operating in the proximity of the NPN, to use a frequency that could create interference towards NPN. Stated differently, certain methods, systems, and techniques may restrict PN UEs from using a frequency close to the frequency of the NPN. Thus, certain embodiments may operate to both progressively create the virtual fence around the NPN cells and improve coexistence once the PN UEs are approaching the virtual fence.

According to certain embodiments, to achieve these goals, the PN may:
- Use UE measurements to determine when a UE that is served by a PN-cell is in proximity of an NPN cell that is using the same band as the macro-cell;
- Use UE positioning information to determine when an outdoor UE is in proximity of an NPN cell. Ideally, the PN may detect when the outdoor UE enters the building or enclosure where the NPN operates;
- Use information provided to the network to automatically learn which cells need to manage co-existence with NPNs and automate cell configuration accordingly; and/or
- Actively offload the UEs operating in proximity an NPN cell to other bands and restrict the use of the NPN-band for those UEs.

Accordingly, certain embodiments may mitigate the adjacent channel interference between two network deployments by guiding the wireless device (such as, for example, a PN UE) to a separate band with significant separation in frequency between the two deployments. Since a wireless device will typically perform measurement on same frequency or those frequencies prioritized by the network, the offloading to separate frequency will not occur unless indicated by the network or the wireless device itself.

According to certain embodiments, methods, systems, and techniques are provided wherein the PN cell operating in proximity to an NPN lists and prioritizes neighboring cells on a separate band to the UE. Further, the PN may actively offload to other bands the UEs that are suspected to be in the close proximity to an NPN.

According to certain embodiments, a wireless device such as, for example, a UE may assist the PN in identifying the cells that are overlapping or are in in proximity to an NPN network.

According to certain embodiments, the PN may use the NPN-band only for UEs that are far enough from the NPN not to cause interference towards NPN. Moreover, the PN will also use the information regarding the position of the UEs that have been impacted by the virtual fence to create beamforming nulls in the NPN-band towards the area where the NPN operates.

Using UE Position to Offload UEs that are Getting Closer to NPN Location

According to certain embodiments, an assumption is that the PN operator and the NPN operator have agreed to collaborate to improve coexistence and that NPN operator has provided the location of the eNBs/gNBs of the NPN and the desired coverage area or, if the NPN is deployed indoor, the NPN operator will provide information regarding the buildings where the NPN is deployed.

According to certain embodiments, the PN operator may identify the PN macro cells that have coverage overlap with the NPN deployments, and for those cells it will enable UE position tracking. If the UE position is determined to be too close to the NPN deployment, the PN may off-load the macro UE to other frequencies available in the area that will not interfere with the NPN operation. Idle or Active UEs or both may be selected for offloading.

Using UE Measurement Reports to Offload UEs that are Getting Closer to NPN Location According to certain embodiments, an assumption is that the PN operator is aware of the NPN deployments (NPN PLMN-ID) and the frequencies used by the NPN. According to certain embodiments, for example, the PN operator may configure the UEs to perform measurements on the frequencies used by the NPN. If the UE reports indicate that the presence of NPN cells with a signal level about a configurable threshold, then the UE will be offloaded to other frequencies.

The PN may also record the position of the UE when the offload occurred, and this information may be used together with the other methods described herein to improve future quality of decisions when the macro UEs should be offloaded.

Using UE Explicit Reports to Learn the Presence and Configuration of the NPN

According to certain embodiments, methods, systems, and techniques are provided for identifying the virtual fence and achieving the desired offloading, useful in the scenarios where the PN and NPN are deployed as separate networks, (i.e., as would be the scenario when NPN is deployed standalone (SNPN) or when deployed as an Public Network Integrated Non Public Network (PNI-NPN)), may be to make use of UE measurements to indicate to the Public Network that a NPN is operating within the proximity of the Public Network cell.

According to a particular embodiment, the Proximity Indication report as defined in 4G standard may be used. For example, the Proximity Report messages include support for the eNB to request a UE to perform additional measurements. Another solution is for a UE that was connected to the NPN network but while moving away from the NPN loses connection to upon connection re-establishment include information about the network ID of the failed network connection, carrier frequency, and possibly additional information in the Radio Link Failure (RLF) Report message.

Figure 2:
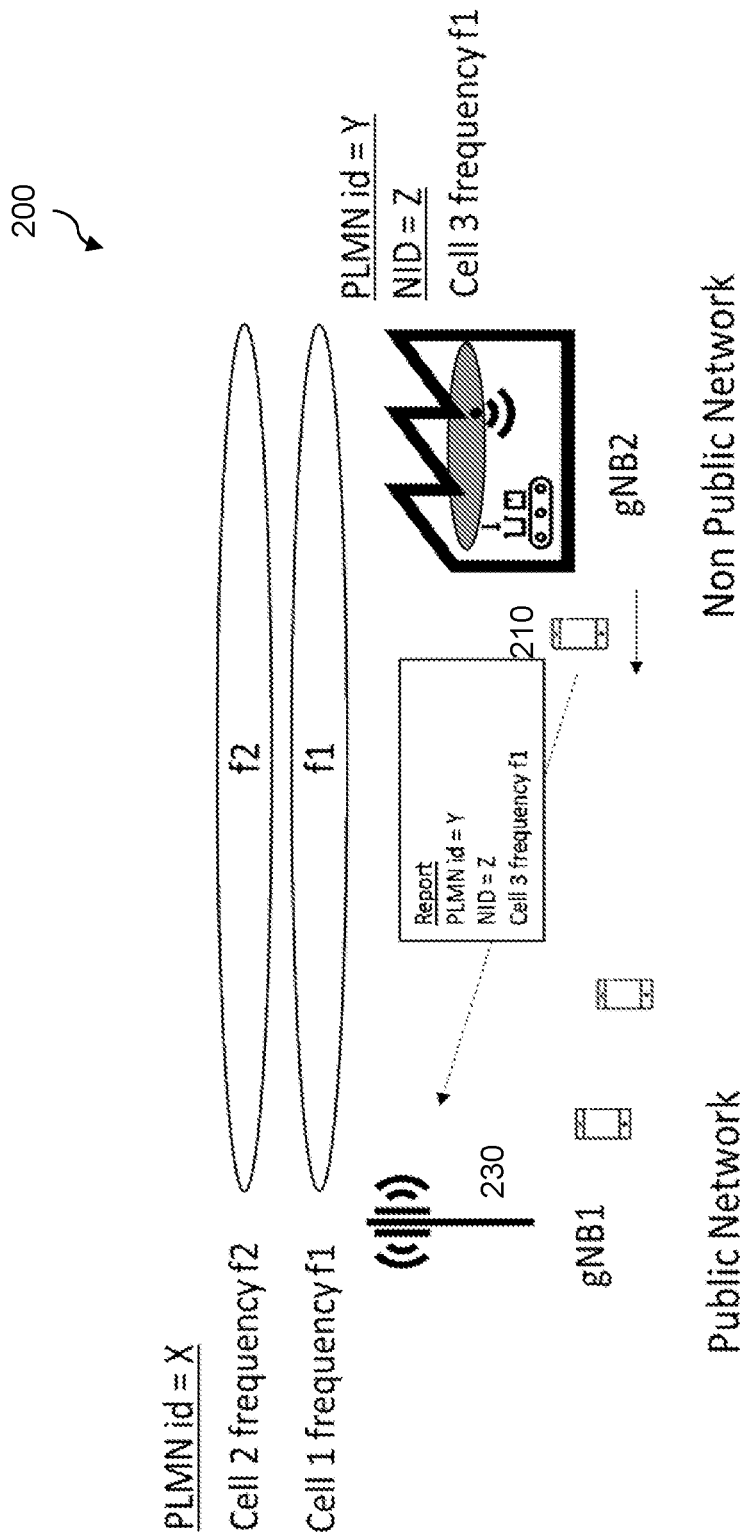
FIG. 2 illustrates an example scenario where a user equipment attached to a private network (PN UE) transmits a measurement report at radio link failure (RLF), according to certain embodiments.

FIG. 2 illustrates an example scenario 200 where a PN UE 210 transmits a measurement report at radio link failure, according to certain embodiments. Specifically, assuming the that the PN UE 210 is allowed to establish a connection with a PN, the PN UE 210 would report the information captured at RLF to the target PN network node 230. The PN node 230 may then use this information to automate learning such as, for example, as part of Automatic Neighbor Relation (ANR) on the presence and configuration of the NPN. The PN node 230 may also use this information to set appropriate configurations such as, for example, neighbor relations in the cell/eNB/gNB, enabling UEs to measure and prioritize other frequencies.

Using UE Mobility Events

Figure 3:
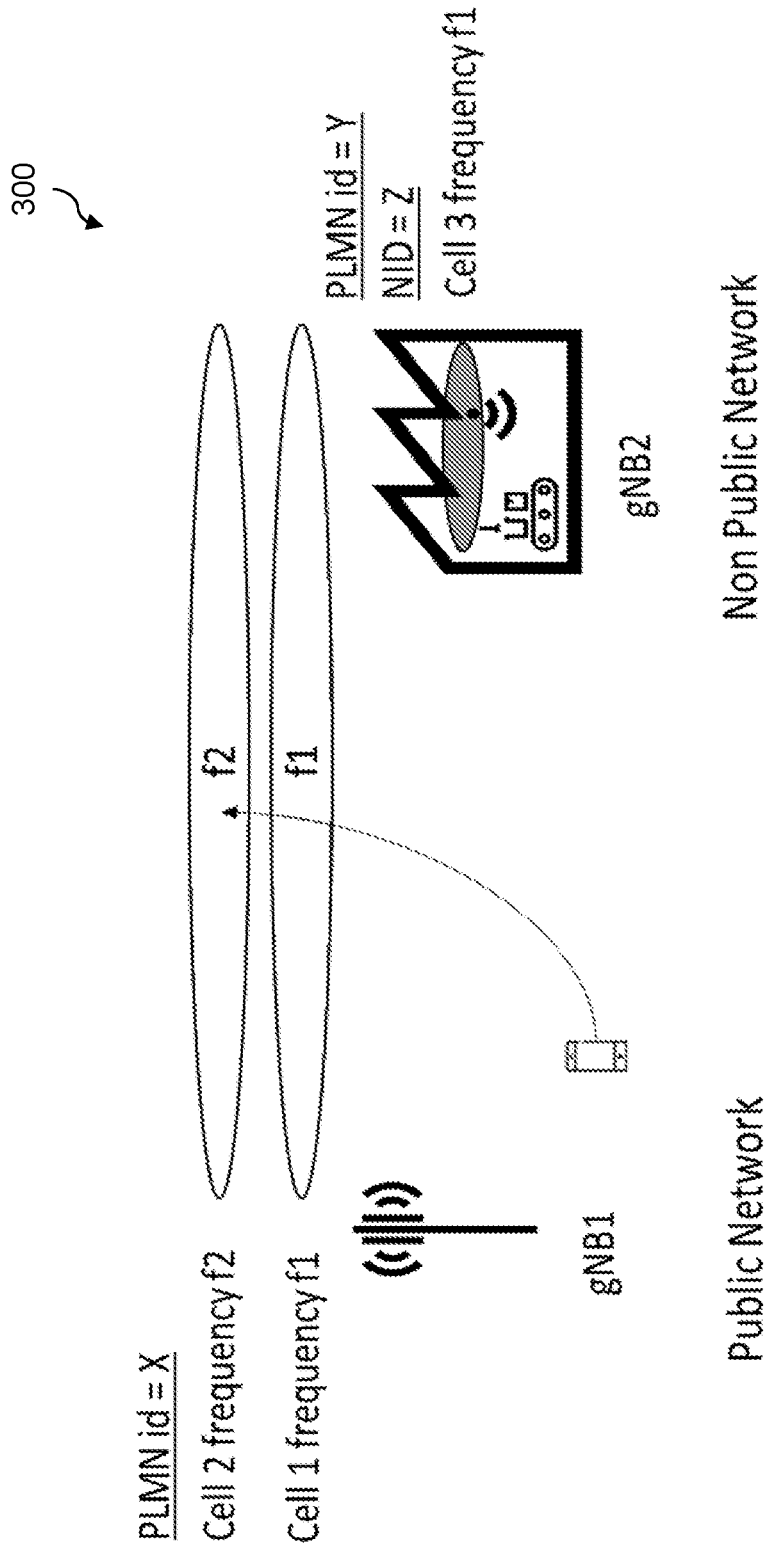
FIG. 3 illustrates an example scenario for frequency offloading in a public network (PN), according to certain embodiments

According to certain embodiments, assuming an PNI-NPN scenario, or if a close collaboration between the NPN operator and the PN operator is possible, then the NPN may configure the network to also broadcast the PN PLMN-ID, similar with a Multi-Operator Core Network (MOCN) scenario. In this case, the PN UEs may measure and report the NPN cells for mobility purposes. Once such mobility event is triggered, the PN core network may take one of the following actions:

Allow the PN UE to connect to the NPN cell if the NPN network is provisioned to provide suitable service for PN UEs Alternatively, the PN core network could use the mobility event to reject the hand-off towards the PNP cell and to instruct the PN network node to offload the UE to other frequencies available in the area Using Macro PN Load Balancing According to certain embodiments, one method to achieve the desired offloading is for the PN cells to be configured with a load balancing parameter such as, for example, a frequency offloading parameter or setting that manually is configured by the Network Management of the PN and the specific cell covering the NPN. By changing the value of parameter lbEUtranTriggerOffloadThreshold to 0 the feature will try to offload the source cell. This would trigger a UE entering the cell to offload to other available frequencies. FIG. 3 illustrates an example scenario 300 for frequency offloading in a PN, according to certain embodiments.

In a particular embodiment, another method may be to set priority parameters in the PN to make a UE select a desired frequency, rather than the frequency adjacent to the NPN.

Protecting NPN when PN is Using Advanced Antenna System

Using the methods described in the other embodiments disclosed herein, the PN may determine which PN UEs have been offloaded due to proximity to the NPN. According to certain embodiments, the PN RAN scheduler may use the position of the offloaded UEs as a proxy for the position of the NPN. Then, the PN scheduler may generate NULLs towards the offloaded UEs with the goal to minimize interference level towards the NPN.

Figure 4:
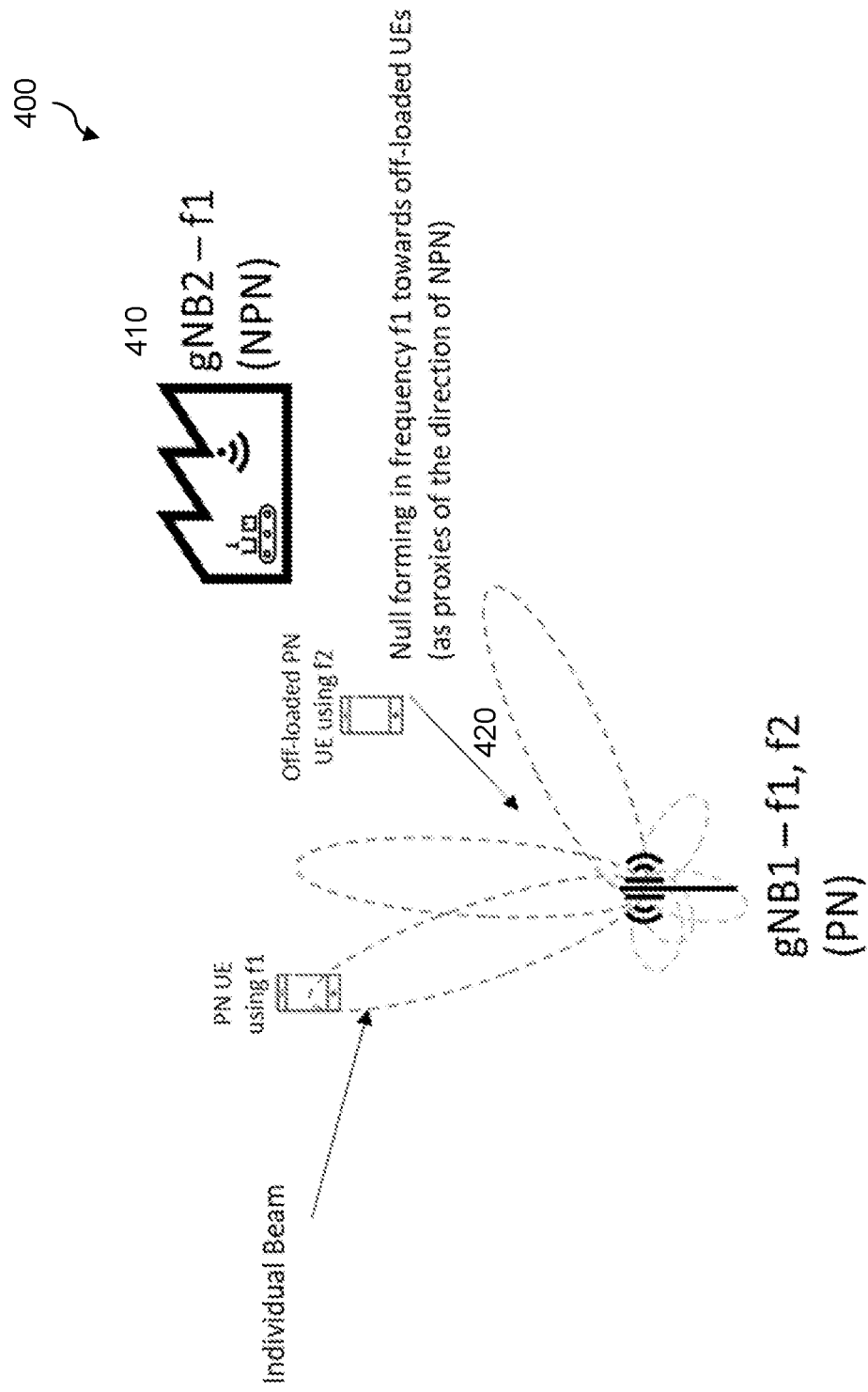
FIG. 4 illustrates an example scenario for protecting a non-public network (NPN) by generating nulls in the direction of the NPN, according to certain embodiments.

FIG. 4 illustrates an example scenario 400 for protecting a NPN 410 by generating nulls 420 in the direction of the NPN 410, according to certain embodiments.

Figure 5:
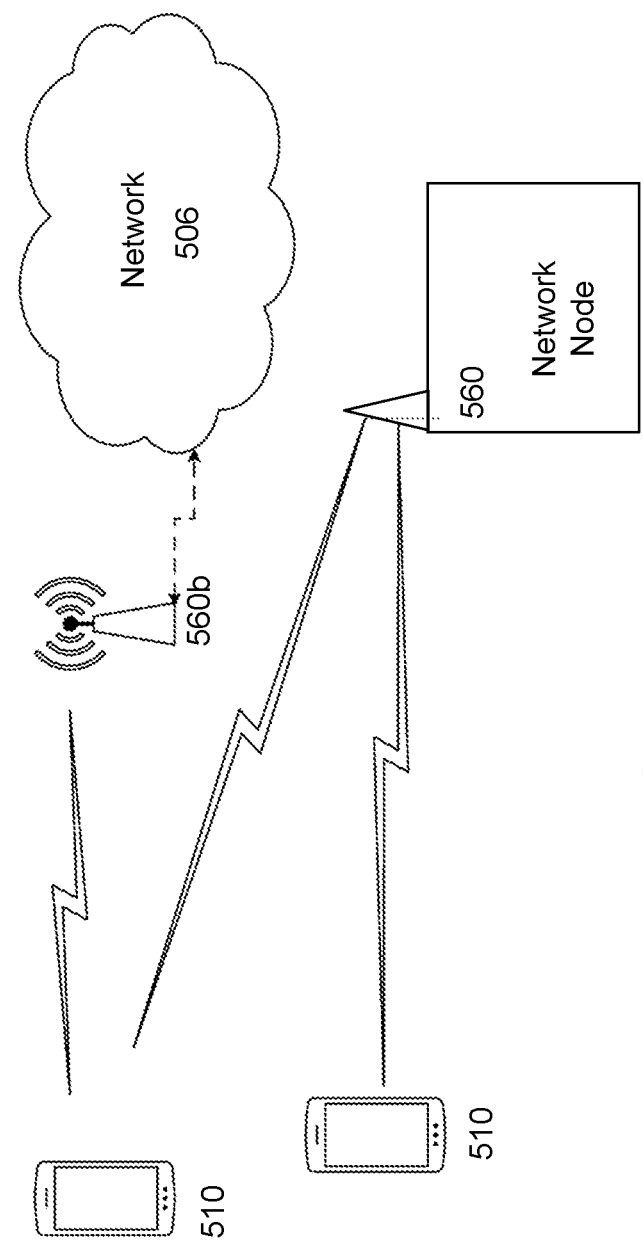
FIG. 5 illustrates an example wireless network, according to certain embodiments.

FIG. 5 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and wireless devices 510. In practice, a wireless network may further include any additional elements suitable to support communication between wireless devices or between a wireless device and another communication device, such as a landline telephone, a service provider, or any other network node or end device. Of the illustrated components, network node 560 and wireless device 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and wireless device 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
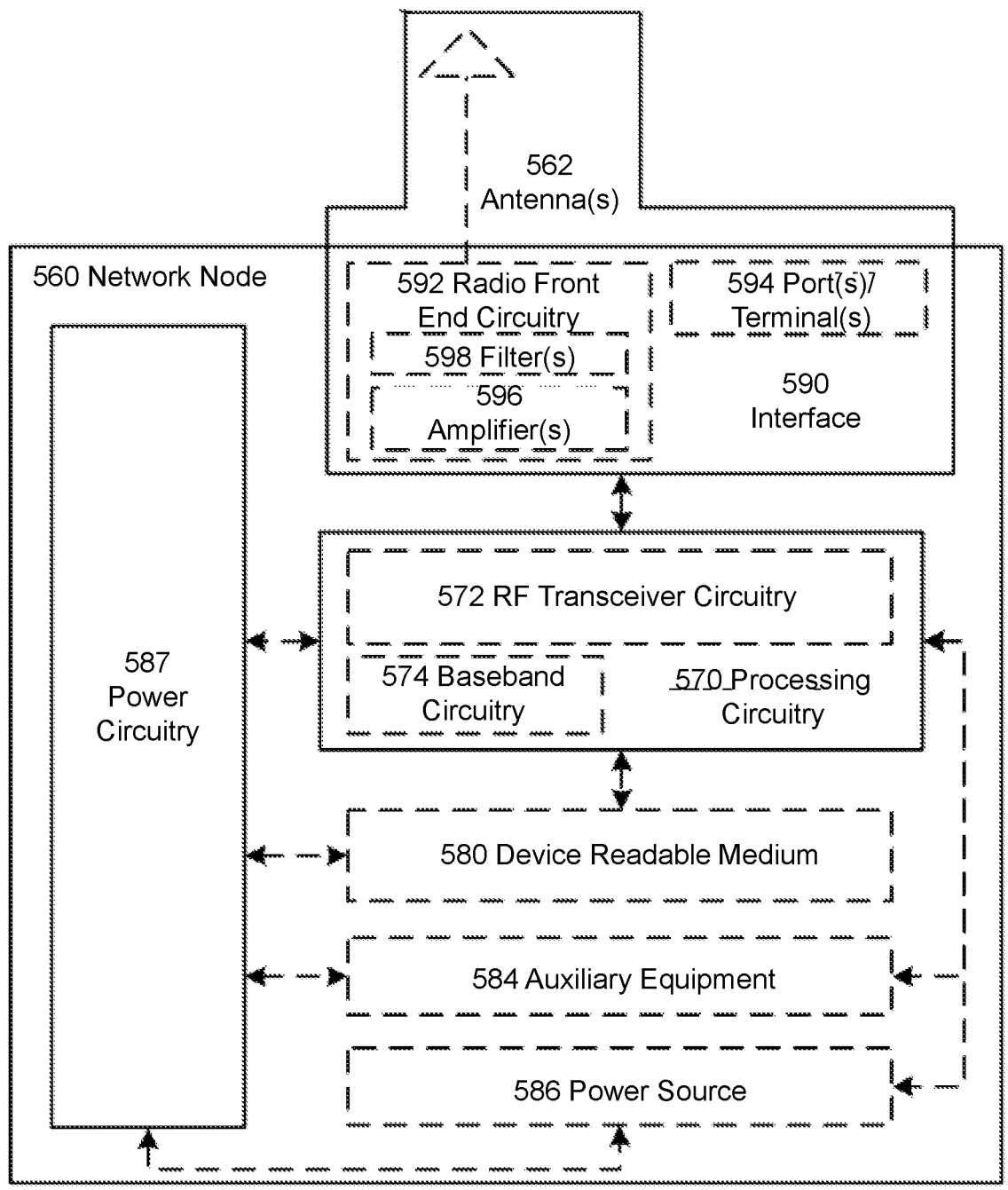
FIG. 6 illustrates an example network node, according to certain embodiments.

FIG. 6 illustrates an example network node 560, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 560 includes processing circuitry 570, device readable medium 580, interface 590, auxiliary equipment 584, power source 586, power circuitry 587, and antenna 562. Although network node 560 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units.

In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560 but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or wireless devices 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or wireless devices via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 6 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

Figure 7:
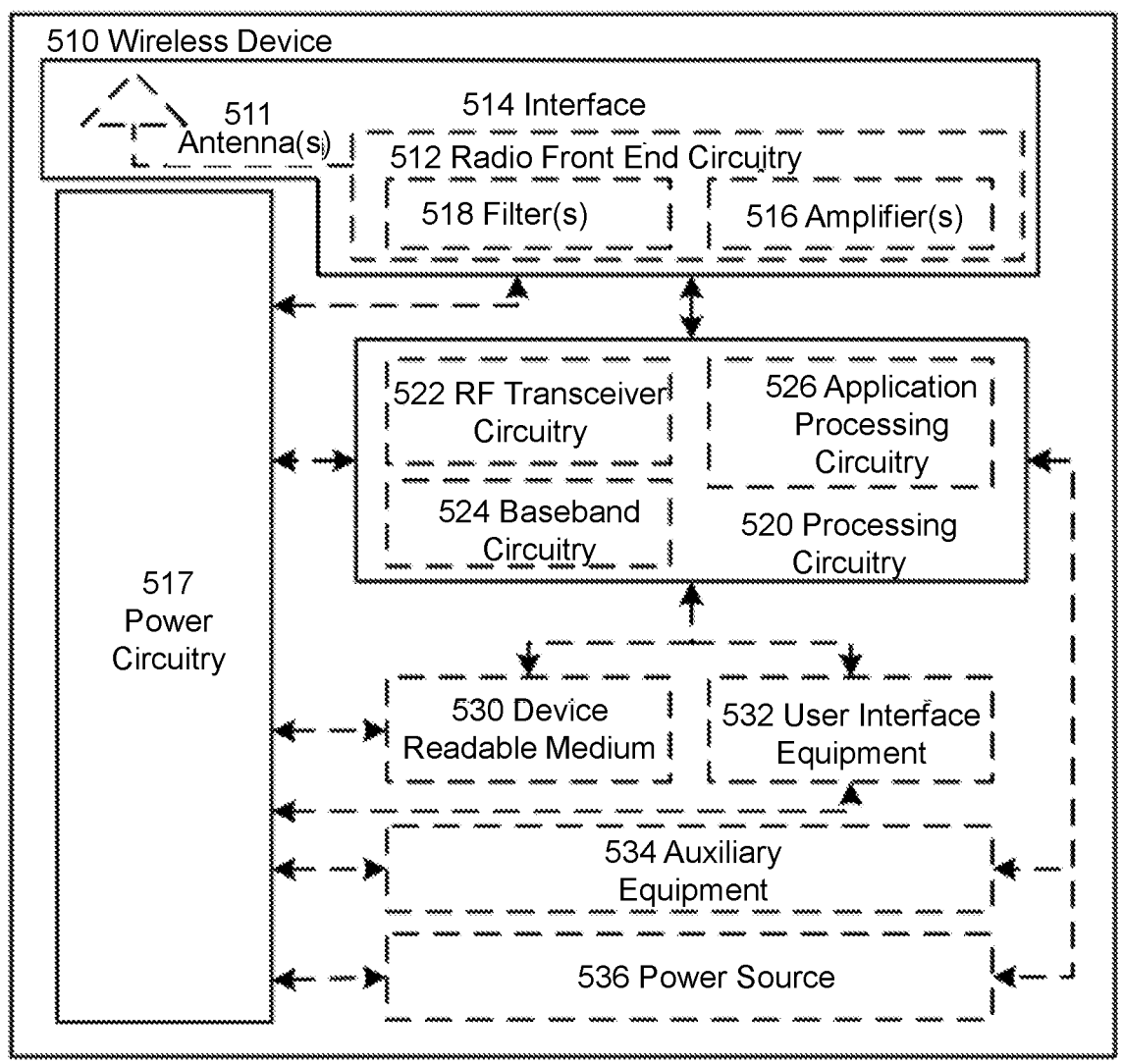
FIG. 7 illustrates an example wireless device, according to certain embodiments.

FIG. 7 illustrates an example wireless device 510. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. Wireless device 510 may include multiple sets of one or more of the illustrated components for different wireless technologies supported by wireless device 510, such as, for example, GSM, WCDMA, LTE, NR, WiFi, WiMAX, or Bluetooth wireless technologies, just to mention a few. These wireless technologies may be integrated into the same or different chips or set of chips as other components within wireless device 510.

Antenna 511 may include one or more antennas or antenna arrays, configured to send and/or receive wireless signals, and is connected to interface 514. In certain alternative embodiments, antenna 511 may be separate from wireless device 510 and be connectable to wireless device 510 through an interface or port. Antenna 511, interface 514, and/or processing circuitry 520 may be configured to perform any receiving or transmitting operations described herein as being performed by a wireless device. Any information, data and/or signals may be received from a network node and/or another wireless device. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520 and is configured to condition signals communicated between antenna 511 and processing circuitry 520. Radio front end circuitry 512 may be coupled to or a part of antenna 511. In some embodiments, wireless device 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or wireless devices via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 510 components, such as device readable medium 530, wireless device 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of wireless device 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a wireless device may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of wireless device 510, but are enjoyed by wireless device 510 as a whole, and/or by end users and the wireless network generally.

Processing circuitry 520 may be configured to perform any determining, calculating, or similar operations (e.g., certain obtaining operations) described herein as being performed by a wireless device. These operations, as performed by processing circuitry 520, may include processing information obtained by processing circuitry 520 by, for example, converting the obtained information into other information, comparing the obtained information or converted information to information stored by wireless device 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with wireless device 510. Such interaction may be of many forms, such as visual, audial, tactile, etc. User interface equipment 532 may be operable to produce output to the user and to allow the user to provide input to wireless device 510. The type of interaction may vary depending on the type of user interface equipment 532 installed in wireless device 510. For example, if wireless device 510 is a smart phone, the interaction may be via a touch screen; if wireless device 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into wireless device 510 and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from wireless device 510, and to allow processing circuitry 520 to output information from wireless device 510. User interface equipment 532 may include, for example, a speaker, a display, vibrating circuitry, a USB port, a headphone interface, or other output circuitry. Using one or more input and output interfaces, devices, and circuits, of user interface equipment 532, wireless device 510 may communicate with end users and/or the wireless network and allow them to benefit from the functionality described herein.

Auxiliary equipment 534 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. wireless device 510 may further comprise power circuitry 537 for delivering power from power source 536 to the various parts of wireless device 510 which need power from power source 536 to carry out any functionality described or indicated herein. Power circuitry 537 may in certain embodiments comprise power management circuitry. Power circuitry 537 may additionally or alternatively be operable to receive power from an external power source; in which case wireless device 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of wireless device 510 to which power is supplied.

Figure 8:
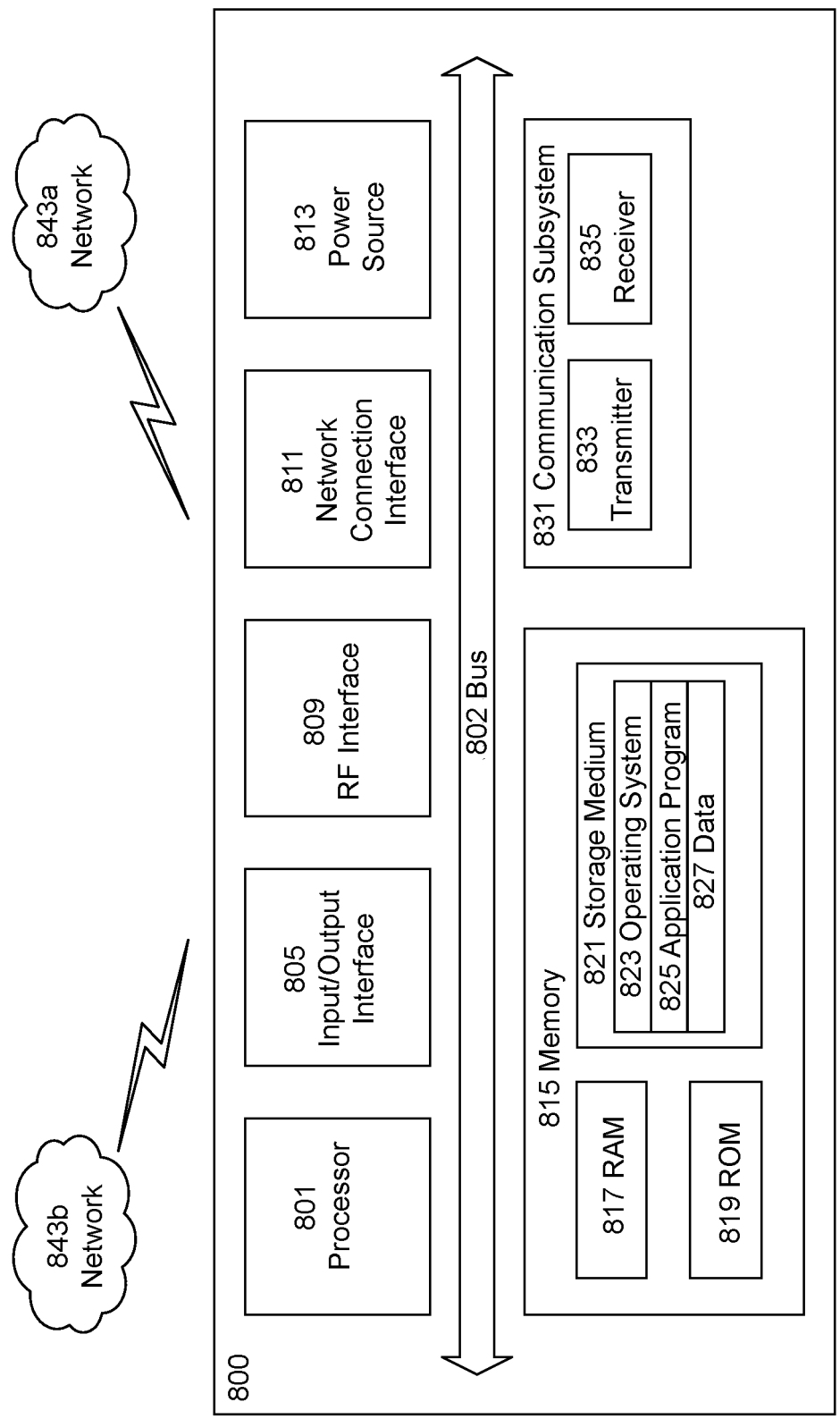
FIG. 8 illustrate an example user equipment, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 800 may be any UE identified by the $3^{rd}$ Generation Partnership Project (3GPP), including a NB-IoT UE, a machine type communication (MTC) UE, and/or an enhanced MTC (eMTC) UE. UE 800, as illustrated in FIG. 6, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 8 is a UE, the components discussed herein are equally applicable to a wireless device, and vice-versa.

In FIG. 8, UE 800 includes processing circuitry 801 that is operatively coupled to input/output interface 805, radio frequency (RF) interface 809, network connection interface 811, memory 815 including random access memory (RAM) 817, read-only memory (ROM) 819, and storage medium 821 or the like, communication subsystem 831, power source 833, and/or any other component, or any combination thereof. Storage medium 821 includes operating system 823, application program 825, and data 827. In other embodiments, storage medium 821 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 801 may be configured to process computer instructions and data. Processing circuitry 801 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 801 may include two central processing units (CPUs). Data may be information in a form suitable for use by a computer.

In the depicted embodiment, input/output interface 805 may be configured to provide a communication interface to an input device, output device, or input and output device. UE 800 may be configured to use an output device via input/output interface 805. An output device may use the same type of interface port as an input device. For example, a USB port may be used to provide input to and output from UE 800. The output device may be a speaker, a sound card, a video card, a display, a monitor, a printer, an actuator, an emitter, a smartcard, another output device, or any combination thereof. UE 800 may be configured to use an input device via input/output interface 805 to allow a user to capture information into UE 800. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 809 may be configured to provide a communication interface to RF components such as a transmitter, a receiver, and an antenna. Network connection interface 811 may be configured to provide a communication interface to network 843*a*. Network 843*a* may encompass wired and/or wireless networks such as a local-area network (LAN), a wide-area network (WAN), a computer network, a wireless network, a telecommunications network, another like network or any combination thereof. For example, network 843*a* may comprise a Wi-Fi network. Network connection interface 811 may be configured to include a receiver and a transmitter interface used to communicate with one or more other devices over a communication network according to one or more communication protocols, such as Ethernet, TCP/IP, SONET, ATM, or the like. Network connection interface 811 may implement receiver and transmitter functionality appropriate to the communication network links (e.g., optical, electrical, and the like). The transmitter and receiver functions may share circuit components, software or firmware, or alternatively may be implemented separately.

RAM 817 may be configured to interface via bus 802 to processing circuitry 801 to provide storage or caching of data or computer instructions during the execution of software programs such as the operating system, application programs, and device drivers. ROM 819 may be configured to provide computer instructions or data to processing circuitry 801. For example, ROM 819 may be configured to store invariant low-level system code or data for basic system functions such as basic input and output (I/O), startup, or reception of keystrokes from a keyboard that are stored in a non-volatile memory. Storage medium 821 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 821 may be configured to include operating system 823, application program 825 such as a web browser application, a widget or gadget engine or another application, and data file 827. Storage medium 821 may store, for use by UE 800, any of a variety of various operating systems or combinations of operating systems.

Storage medium 821 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 821 may allow UE 800 to access computer-executable instructions, application programs or the like, stored on transitory or non-transitory memory media, to off-load data, or to upload data. An article of manufacture, such as one utilizing a communication system may be tangibly embodied in storage medium 821, which may comprise a device readable medium.

In FIG. 8, processing circuitry 801 may be configured to communicate with network 843*b* using communication subsystem 831. Network 843*a* and network 843*b* may be the same network or networks or different network or networks. Communication subsystem 831 may be configured to include one or more transceivers used to communicate with network 843*b*. For example, communication subsystem 831 may be configured to include one or more transceivers used to communicate with one or more remote transceivers of another device capable of wireless communication such as another wireless device, UE, or base station of a radio access network (RAN) according to one or more communication protocols, such as IEEE 802.8, CDMA, WCDMA, GSM, LTE, UTRAN, WiMax, or the like. Each transceiver may include transmitter 833 and/or receiver 835 to implement transmitter or receiver functionality, respectively, appropriate to the RAN links (e.g., frequency allocations and the like). Further, transmitter 833 and receiver 835 of each transceiver may share circuit components, software or firmware, or alternatively may be implemented separately.

In the illustrated embodiment, the communication functions of communication subsystem 831 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 831 may include cellular communication, Wi-Fi communication, Bluetooth communication, and GPS communication. Network 843*b* may encompass wired and/or wireless networks such as a local-area network (LAN), a wide-area network (WAN), a computer network, a wireless network, a telecommunications network, another like network or any combination thereof. For example, network 843*b* may be a cellular network, a Wi-Fi network, and/or a near-field network. Power source 813 may be configured to provide alternating current (AC) or direct current (DC) power to components of UE 800.

The features, benefits and/or functions described herein may be implemented in one of the components of UE 800 or partitioned across multiple components of UE 800. Further, the features, benefits, and/or functions described herein may be implemented in any combination of hardware, software or firmware. In one example, communication subsystem 831 may be configured to include any of the components described herein. Further, processing circuitry 801 may be configured to communicate with any of such components over bus 802. In another example, any of such components may be represented by program instructions stored in memory that when executed by processing circuitry 801 perform the corresponding functions described herein. In another example, the functionality of any of such components may be partitioned between processing circuitry 801 and communication subsystem 831. In another example, the non-computationally intensive functions of any of such components may be implemented in software or firmware and the computationally intensive functions may be implemented in hardware.

Figure 9:
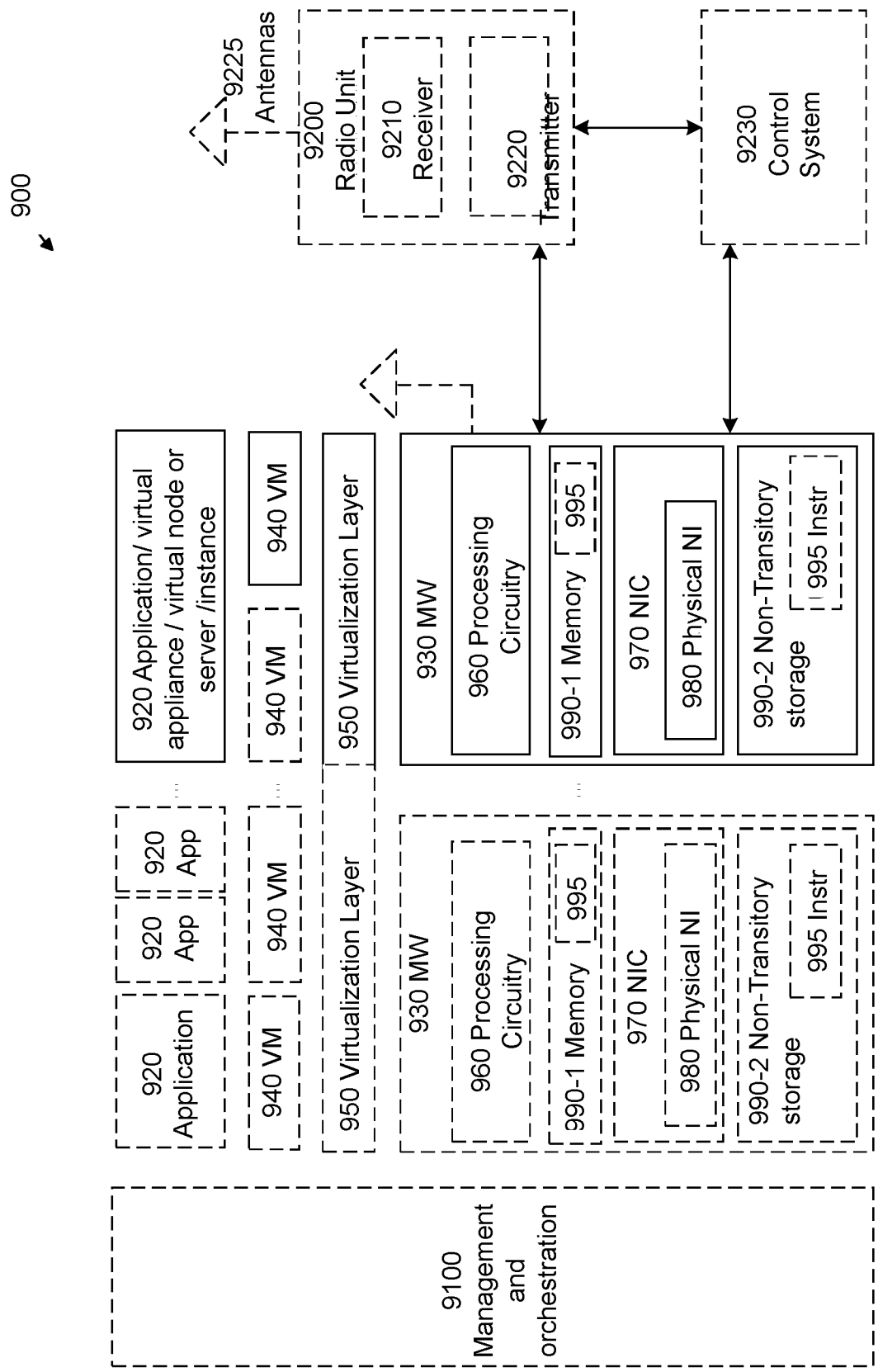
FIG. 9 illustrates a virtualization environment in which functions implemented by some embodiments may be virtualized, according to certain embodiments.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. Applications 920 are run in virtualization environment 900 which provides hardware 930 comprising processing circuitry 960 and memory 990. Memory 990 contains instructions 995 executable by processing circuitry 960 whereby application 920 is operative to provide one or more of the features, benefits, and/or functions disclosed herein.

Virtualization environment 900, comprises general-purpose or special-purpose network hardware devices 930 comprising a set of one or more processors or processing circuitry 960, which may be commercial off-the-shelf (COTS) processors, dedicated Application Specific Integrated Circuits (ASICs), or any other type of processing circuitry including digital or analog hardware components or special purpose processors. Each hardware device may comprise memory 990-1 which may be non-persistent memory for temporarily storing instructions 995 or software executed by processing circuitry 960. Each hardware device may comprise one or more network interface controllers (NICs) 970, also known as network interface cards, which include physical network interface 980. Each hardware device may also include non-transitory, persistent, machine-readable storage media 990-2 having stored therein software 995 and/or instructions executable by processing circuitry 960. Software 995 may include any type of software including software for instantiating one or more virtualization layers 950 (also referred to as hypervisors), software to execute virtual machines 940 as well as software allowing it to execute functions, features and/or benefits described in relation with some embodiments described herein.

Virtual machines 940, comprise virtual processing, virtual memory, virtual networking or interface and virtual storage, and may be run by a corresponding virtualization layer 950 or hypervisor. Different embodiments of the instance of virtual appliance 920 may be implemented on one or more of virtual machines 940, and the implementations may be made in different ways.

During operation, processing circuitry 960 executes software 995 to instantiate the hypervisor or virtualization layer 950, which may sometimes be referred to as a virtual machine monitor (VMM). Virtualization layer 950 may present a virtual operating platform that appears like networking hardware to virtual machine 940.

As shown in FIG. 9, hardware 930 may be a standalone network node with generic or specific components. Hardware 930 may comprise antenna 9225 and may implement some functions via virtualization. Alternatively, hardware 930 may be part of a larger cluster of hardware (e.g. such as in a data center or customer premise equipment (CPE)) where many hardware nodes work together and are managed via management and orchestration (MANO) 9100, which, among others, oversees lifecycle management of applications 920.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 940 may be a software implementation of a physical machine that runs programs as if they were executing on a physical, non-virtualized machine. Each of virtual machines 940, and that part of hardware 930 that executes that virtual machine, be it hardware dedicated to that virtual machine and/or hardware shared by that virtual machine with others of the virtual machines 940, forms a separate virtual network elements (VNE).

Still in the context of NFV, Virtual Network Function (VNF) is responsible for handling specific network functions that run in one or more virtual machines 940 on top of hardware networking infrastructure 930 and corresponds to application 920 in FIG. 9.

In some embodiments, one or more radio units 9200 that each include one or more transmitters 9220 and one or more receivers 9210 may be coupled to one or more antennas 9225. Radio units 9200 may communicate directly with hardware nodes 930 via one or more appropriate network interfaces and may be used in combination with the virtual components to provide a virtual node with radio capabilities, such as a radio access node or a base station.

In some embodiments, some signaling can be affected with the use of control system 9230 which may alternatively be used for communication between the hardware nodes 930 and radio units 9200.

Figure 10:
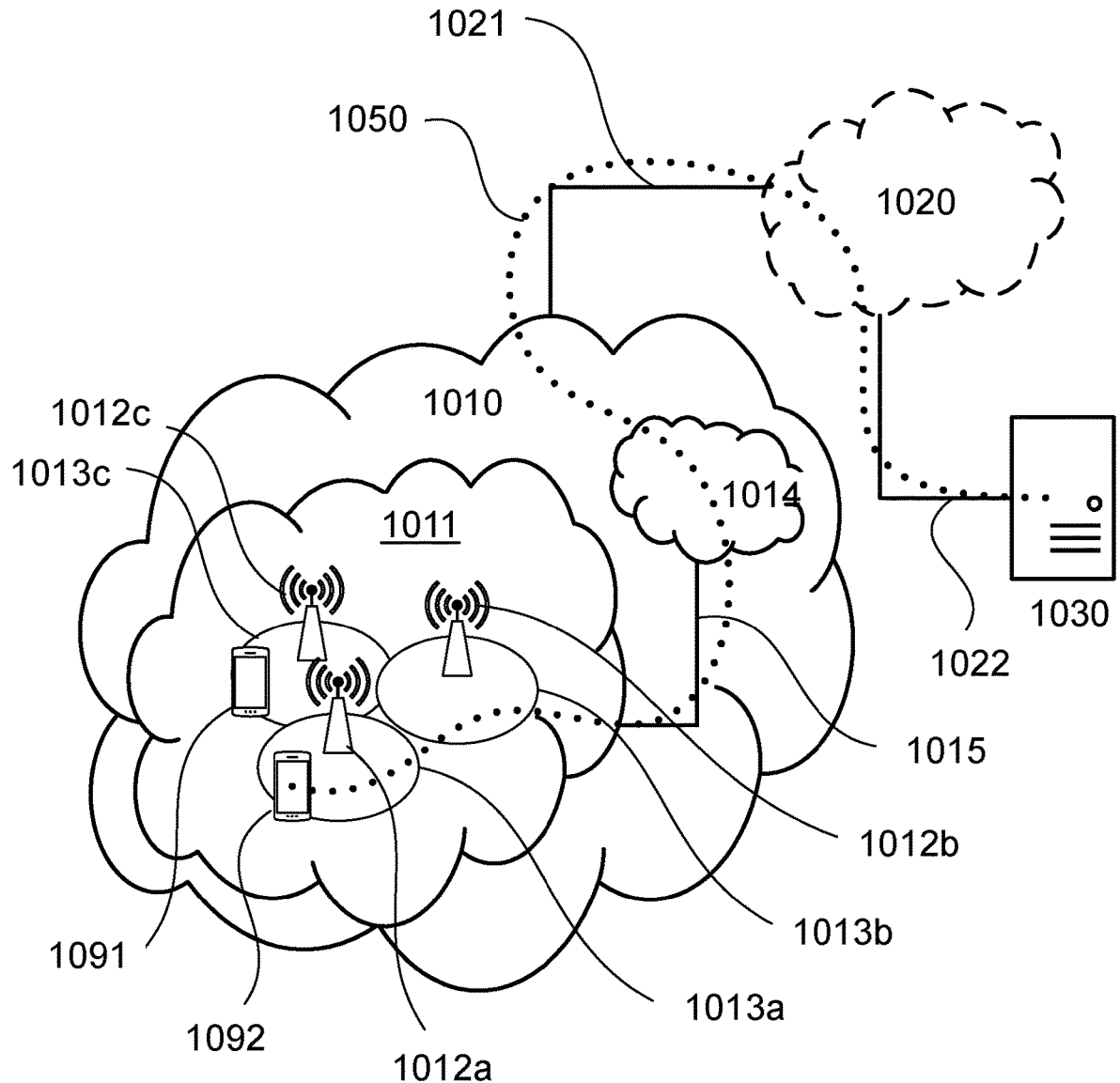
FIG. 10 illustrates a telecommunication network connected via an intermediate network to a host computer, according to certain embodiments.

FIG. 10 illustrates a telecommunication network connected via an intermediate network to a host computer in accordance with some embodiments.

With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Figure 11:
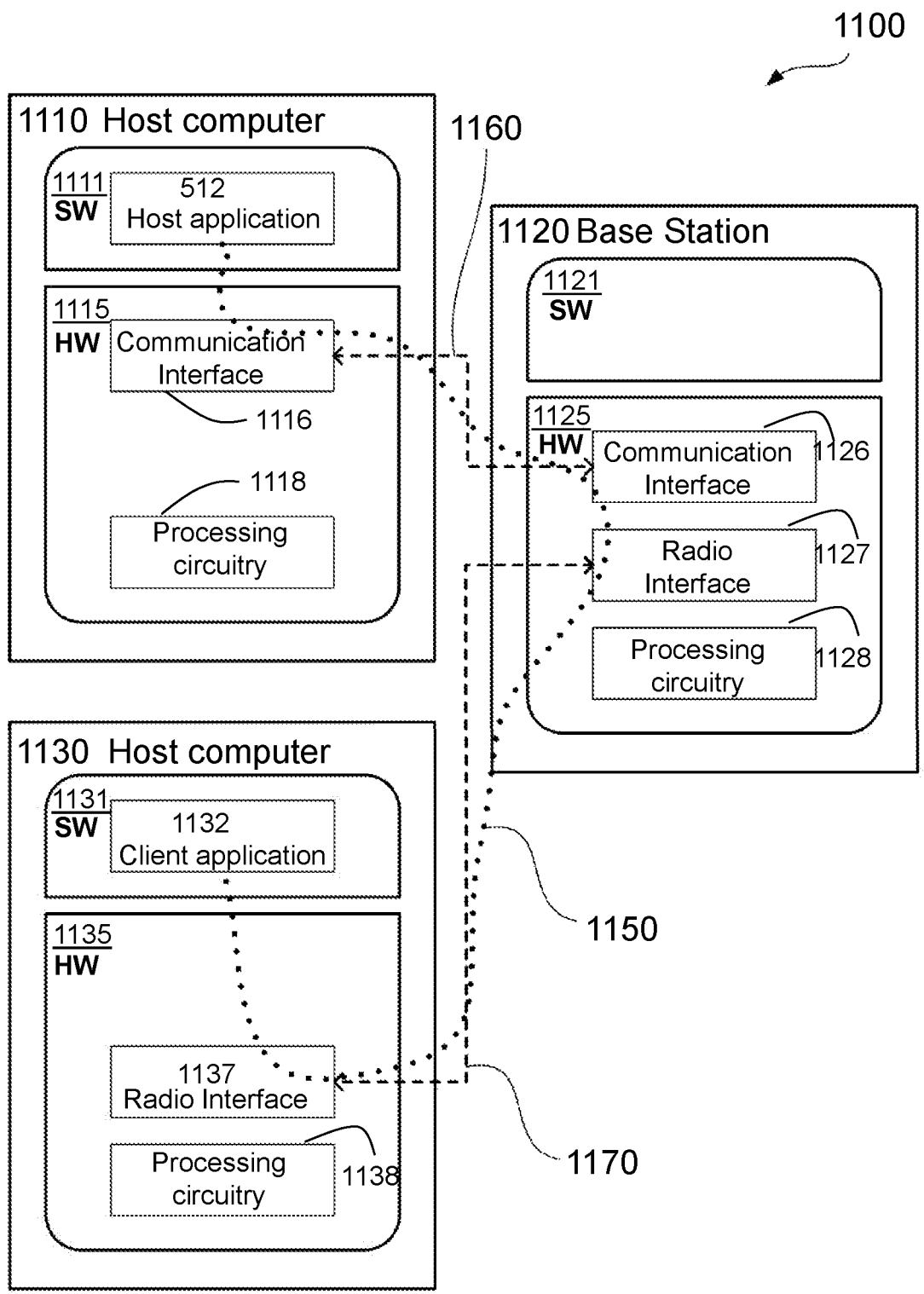
FIG. 11 illustrates a generalized block diagram of a host computer communicating via a base station with a user equipment over a partially wireless connection, according to certain embodiments.

FIG. 11 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figures 12, 13:
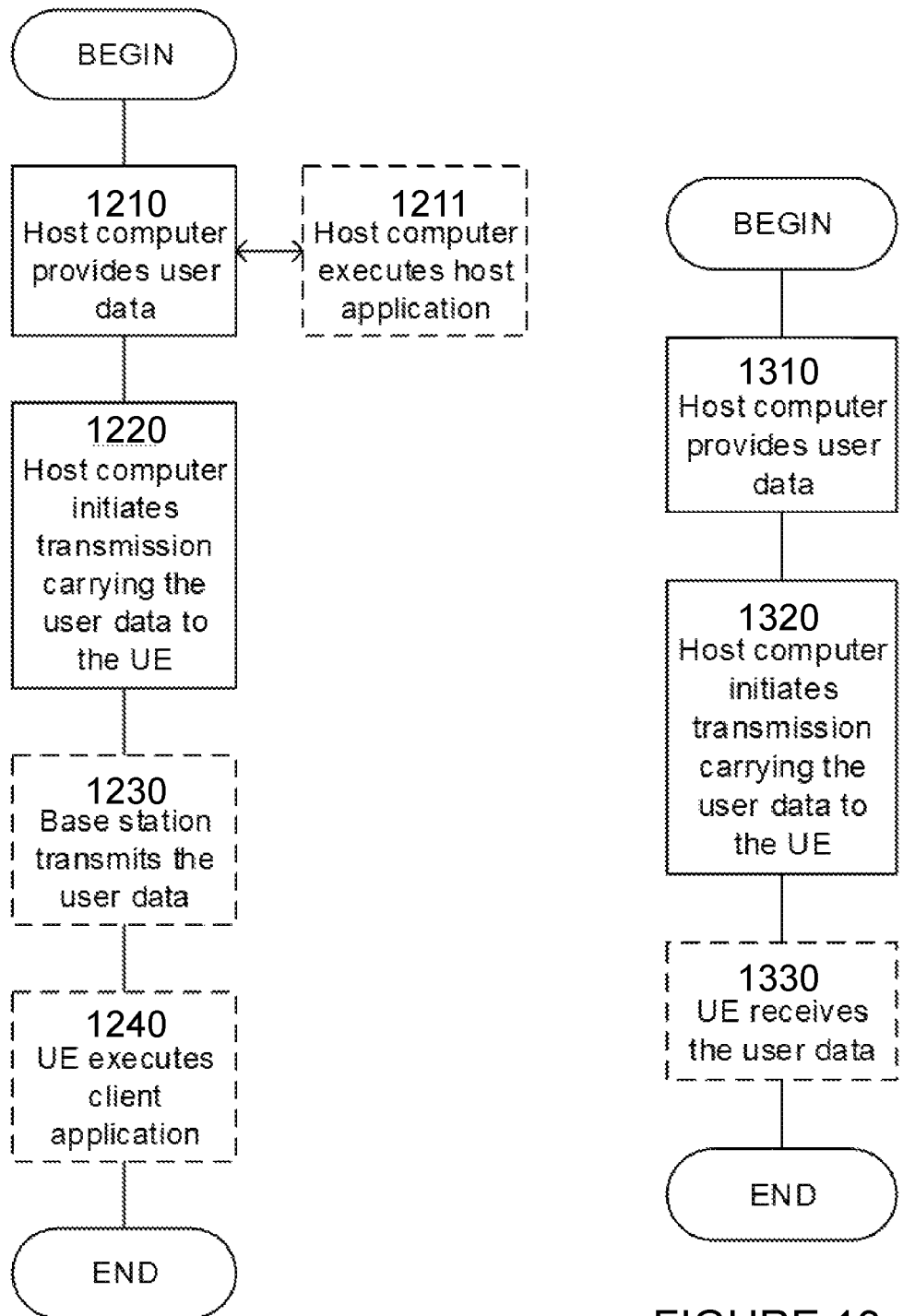
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figures 14, 15:
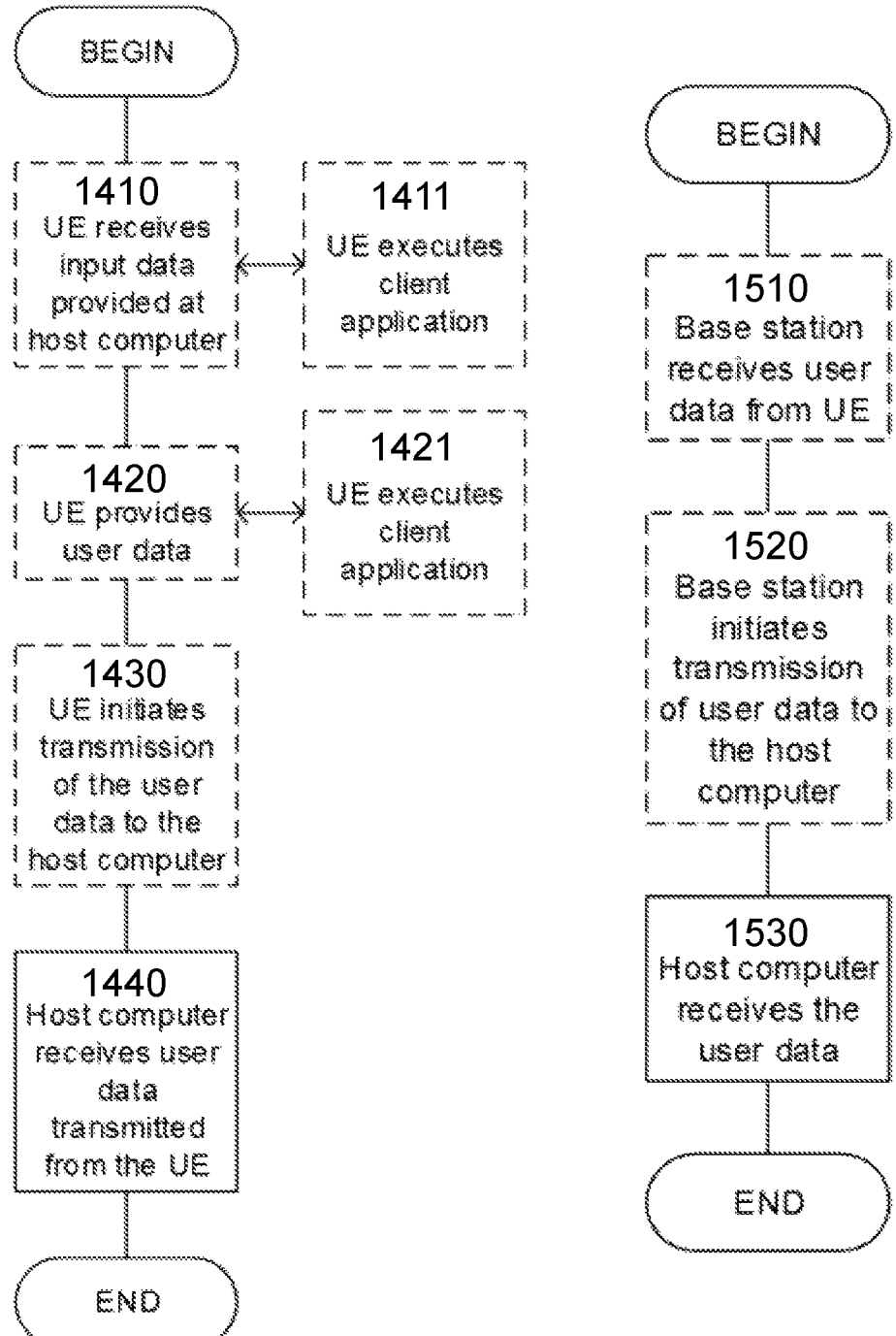
FIG. 14 illustrates another method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Figure 16:
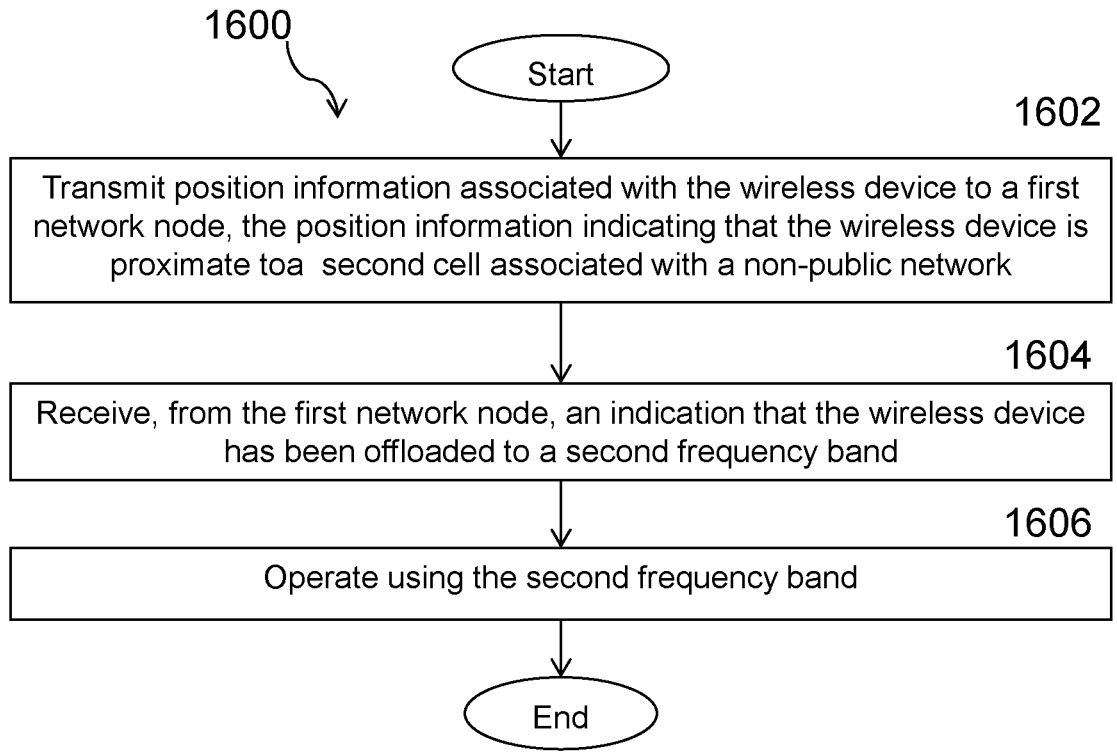
FIG. 16 illustrates an example method by a wireless device, according to certain embodiments.

FIG. 16 depicts a method 1600 by a wireless device 510 operating on a first frequency band in a first cell associated with a PN, according to certain embodiments. At step 1702, the wireless device transmits 510 position information associated with the wireless device 510 to a first network node 560. The position information indicating that the wireless device 510 is proximate to a second cell associated with a NPN. At step 1704, the wireless device 510 receives, from the first network node, an indication that the wireless device 510 has been offloaded to a second frequency band. At step 1706, the wireless device 510 operates using the second frequency band.

In a particular embodiment, the second frequency band is separated from the first frequency band by more than a threshold amount.

In a particular embodiment, at least a portion of the first cell is proximate to or overlapping with the second cell associated with the NPN.

In a particular embodiment, the at least a portion of the first cell is proximate to the second cell when the distance between the at least a portion of the first cell and the second cell is less than a threshold amount.

In a particular embodiment, the first cell is at least one public network macro cell. In a particular embodiment, the wireless device 510 is attached to the PN.

In a particular embodiment, the wireless devices 510 is in an active state.

In a particular embodiment, the wireless devices 510 is in an idle state.

In a particular embodiment, the wireless device 510 performs at least one measurement on the second cell associated with the NPN.

In a particular embodiment, the wireless device 510 is proximate to the second cell associated with the NPN when the at least one measurement indicates that a signal level in the second cell is equal to or greater than a threshold value.

In a particular embodiment, the wireless device 510 receives, from a first network node 560, a request for at least one measurement associated with the second cell and transmitting the at least one measurement to the network node 560.

In a particular embodiment, the at least one measurement is transmitted in a RLF report. In a particular embodiment, the wireless device 510 detects a mobility event and wherein the at least one measurement is transmitted to the network node 560 in response to detecting the mobility event.

In a particular embodiment, the second frequency band is selected by the wireless device 510 from a plurality of frequency bands.

Figure 17:
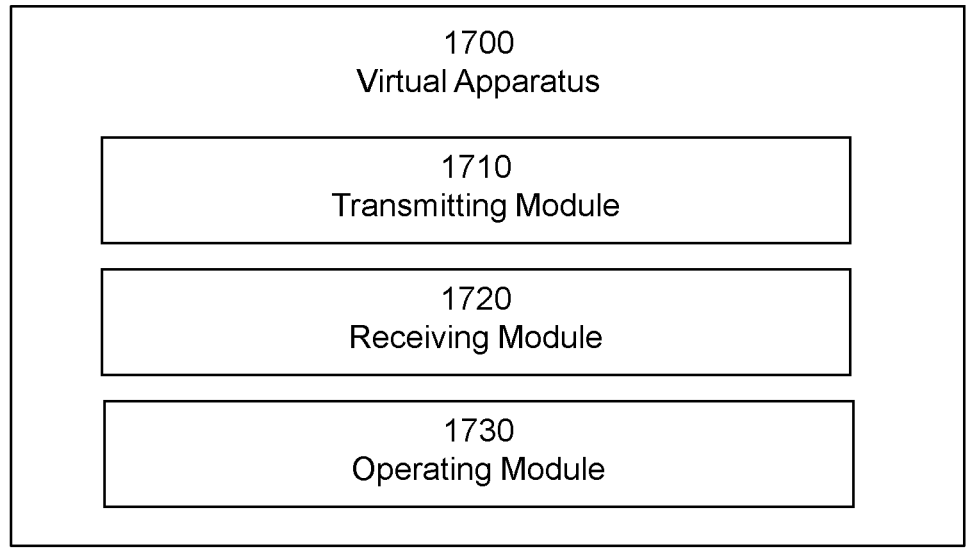
FIG. 17 illustrates an exemplary virtual computing device, according to certain embodiments.

FIG. 17 illustrates a schematic block diagram of a virtual apparatus 1700 in a wireless network (for example, the wireless network shown in FIG. 5). The apparatus may be implemented in a wireless device or network node (e.g., wireless device 510 or network node 560 shown in FIG. 5). Apparatus 1700 is operable to carry out the example method described with reference to FIG. 16 and possibly any other processes or methods disclosed herein. It is also to be understood that the method of FIG. 16 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1710, receiving module 1720, operating module 1730, and any other suitable units of apparatus 1700 to perform corresponding functions according one or more embodiments of the present disclosure.

According to certain embodiments, transmitting module 1710 may perform certain of the transmitting functions of the apparatus 1700. For example, transmitting module 1710 may transmit position information associated with the wireless device 510 to a first network node 560. The position information indicating that the wireless device 510 is proximate to a second cell associated with a NPN.

According to certain embodiments, receiving module 1720 may perform certain of the receiving functions of the apparatus 1700. For example, receiving module 1720 may receive, from the first network node 560, an indication that the wireless device 510 has been offloaded to a second frequency band.

According to certain embodiments, operating module 1720 may perform certain of the operating functions of the apparatus 1700. For example, operating module 1720 may operate using the second frequency band.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 18:
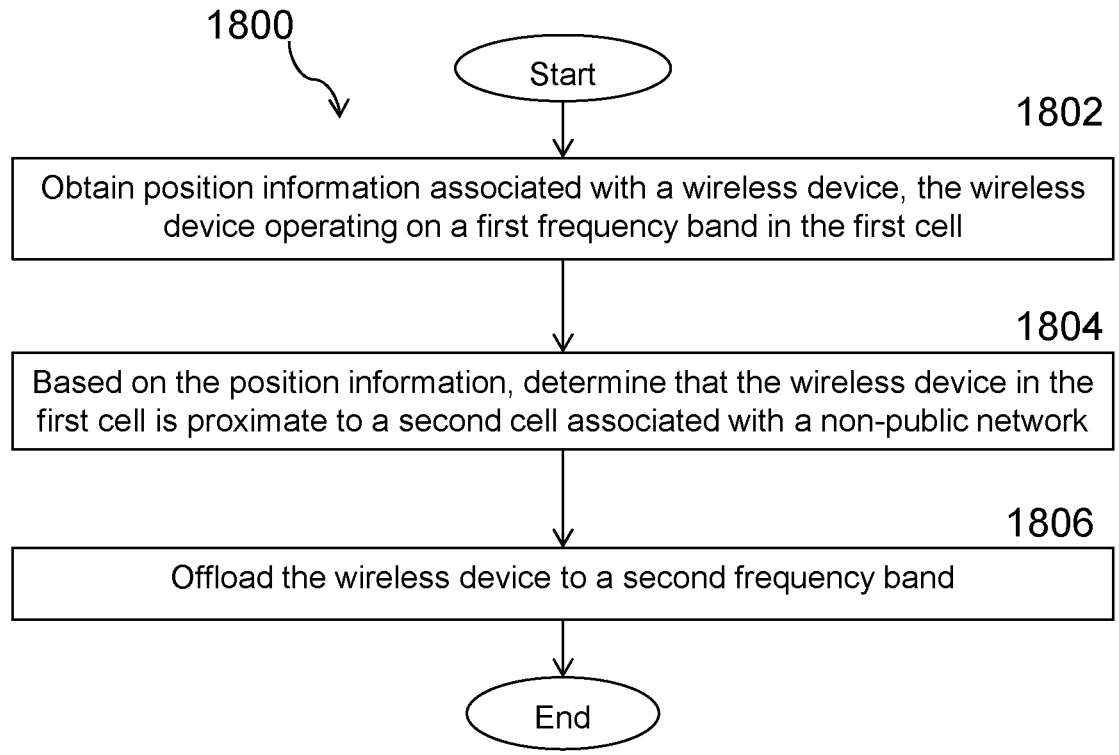
FIG. 18 illustrates an example method by a network node, according to certain embodiments.

FIG. 18 depicts a method 1800 for mitigating channel interference by a first network node 560 associated with a PN in a first cell, according to certain embodiments. At step 1802, the network node 560 obtains position information associated with a wireless device 510. The wireless device 510 operates on a first frequency band in the first cell. Based on the position information, the network node 560 determines that the wireless device 510 in the first cell is proximate to a second cell associated with a NPN, at step 1804. At step 1806, the network node 560 offloads the wireless device 510 to a second frequency band.

In a particular embodiment, the second frequency band is separated from the first frequency band by more than a threshold amount.

In a particular embodiment, the network node 560 determines that at least a portion of the first cell is proximate to or overlapping with the second cell associated with the NPN.

In a particular embodiment, the at least a portion of the first cell is proximate to the second cell when the distance between the at least a portion of the first cell and the second cell is less than a threshold amount.

In a particular embodiment, the network node 560 receives information from the NPN, and the information comprises location information of at least one additional network node 560 operating in the NPN.

In a particular embodiment, determining that the wireless device 510 in the first cell is proximate to the second cell associated with the NPN includes determining, based on the position information associated with the wireless device 510 and the location information of the at least one additional network node 560, that a distance between the wireless device 510 and the at least one additional network node 560 is less than a threshold amount.

In a particular embodiment, the first cell is at least one public network macro cell.

In a particular embodiment, the wireless device 510 is attached to the PN.

In a particular embodiment, the wireless device 510 is in an active state.

In a particular embodiment, the wireless device 510 is in an idle state.

In a particular embodiment, the network node 560 configures the wireless device 510 to perform at least one measurement on the second cell associated with the NPN.

In a particular embodiment, determining that the wireless device 510 in the first cell is proximate to the second cell associated with the NPN comprises determining that the at least one measurement indicates that a signal level in the second cell is equal to or greater than a threshold value.

In a particular embodiment, the network node 560 transmits, to the wireless device 510, a request for at least one measurement associated with the second cell and receiving the at least one measurement from the wireless device 510.

In a particular embodiment, the at least one measurement is received in a RLF report. In a particular embodiment, the at least one measurement is received in response to a mobility event being detected by the wireless device 510, and the network node 560 performs a handover the wireless device 510 to the NPN or rejects a handover of the wireless device 510 to the NPN.

In a particular embodiment, the network node 560 stores a location of the wireless device 510 when the wireless device 510 was offloaded to the second frequency band.

In a particular embodiment, the second frequency band is selected by the wireless device 510 from a plurality of frequency bands.

In a particular embodiment, after offloading the wireless device 510, the network node 560 stores location information associated with the wireless device 510, uses the location information associated with the wireless device 510 as a proxy position for a second network node 560 associated with the NPN, and generates a NULL toward the wireless device 510.

Figure 19:
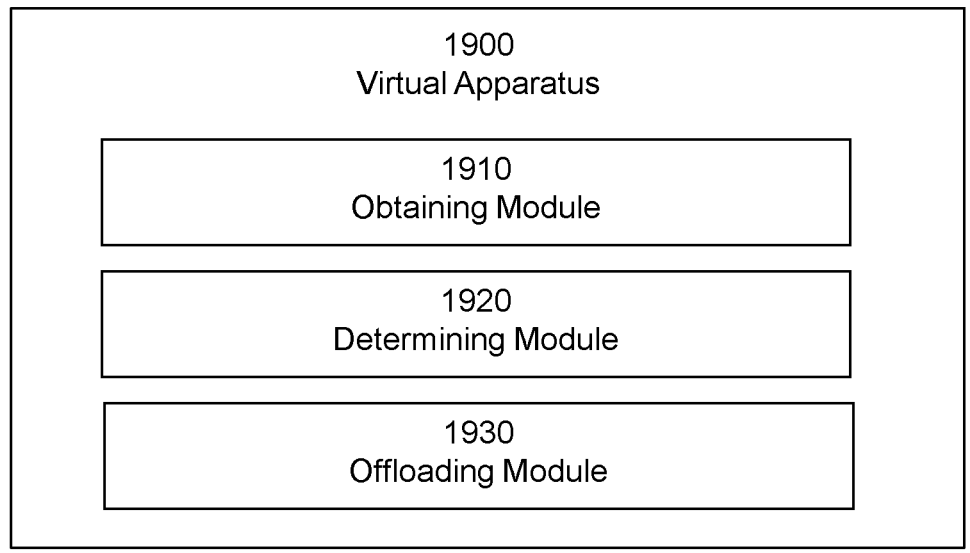
FIG. 19 illustrates another exemplary virtual computing device, according to certain embodiments.

FIG. 19 illustrates a schematic block diagram of a virtual apparatus 1900 in a wireless network (for example, the wireless network shown in FIG. 5). The apparatus may be implemented in a wireless device or network node (e.g., wireless device 510 or network node 560 shown in FIG. 5). Apparatus 1900 is operable to carry out the example method described with reference to FIG. 18 and possibly any other processes or methods disclosed herein. It is also to be understood that the method of FIG. 18 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 1910, determining module 1920, 1930 offloading module, and any other suitable units of apparatus 1900 to perform corresponding functions according one or more embodiments of the present disclosure.

According to certain embodiments, obtaining module 1910 may perform certain of the obtaining functions of the apparatus 1900. For example, obtaining module 1910 may obtain position information associated with a wireless device 510 operating on a first frequency band in the first cell.

According to certain embodiments, determining module 1920 may perform certain of the determining functions of the apparatus 1900. For example, based on the position information, determining module 1920 may determine that the wireless device 510 in the first cell is proximate to a second cell associated with a NPN.

According to certain embodiments, offloading module 1920 may perform certain of the offloading functions of the apparatus 1900. For example, offloading module 1920 may offload the wireless device 510 to a second frequency band.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 20:
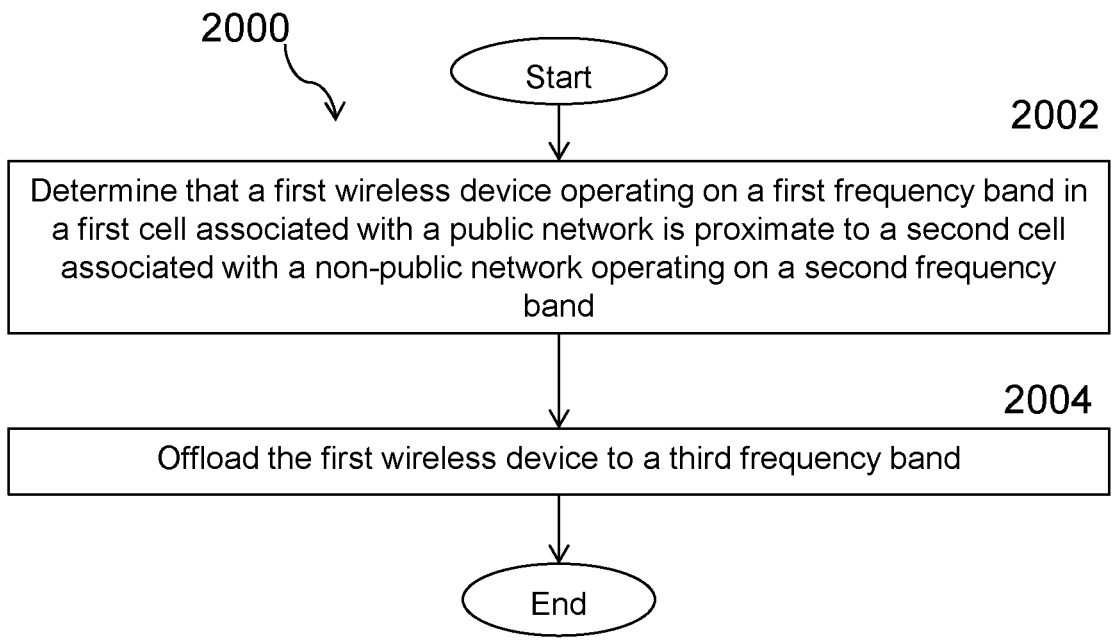
FIG. 20 illustrates a method by a first network node associated with a PN in a first cell, according to certain embodiments.

FIG. 20 depicts another method 2000 by a first network node 560 associated with a PN in a first cell, according to certain embodiments. At step 2002, the first network node 560 determines that a first wireless device 510 operating on a first frequency band in the first cell is proximate to a second cell associated with a NPN operating on a second frequency band. At step 2004, the first network node 560 offloads the first wireless device 510 to a third frequency band.

In a particular embodiment, the third frequency band is separated from the second frequency band by more than a threshold amount.

In a particular embodiment, at least a portion of the first frequency band and the second frequency band include a shared band.

In a particular embodiment, the first frequency band is adjacent to the second frequency band.

In a particular embodiment, the first network node 160 determines that at least a portion of the first cell is proximate to or overlapping with the second cell associated with the NPN. In a further particular embodiment, the at least a portion of the first cell is proximate to the second cell when a distance between the at least a portion of the first cell and the second cell is less than a threshold amount.

In a particular embodiment, the first network node 560 receives, from a second wireless device 510, first information associated with the NPN. The first information comprises at least one of: a network identifier associated with the NPN, the second frequency band on which the NPN is operating; and a public land management network identifier associated with the NPN. In a further particular embodiment, the first information is received from the second wireless device 510 during a handover of the second wireless device 510 from the NPN to the PN. In a further particular embodiment, the first information is received from the second wireless device in a RLF report. In a further particular embodiment, the first network node 560 sends, to the second wireless device 510, a request for at least one measurement associated with the second cell associated with the NPN.

In a particular embodiment, the first network node 560 receives second information from the NPN, and the second information includes location information of at least one additional network node operating in the NPN.

In a particular embodiment, the first network node 560 determines that the first wireless device 510 is proximate the second cell associated with the NPN based on at least one of the first information and the second information.

In a particular embodiment, the first network node 560 obtains position information associated with the first wireless device. The first network node 560 determines that the first wireless device 510 is proximate the second cell associated with the NPN based on the position information associated with the first wireless device 510.

In a particular embodiment, determining that the first wireless device 510 in the first cell is proximate to the second cell associated with the NPN includes determining, based on the position information associated with the first wireless device 510 and location information of at least one additional network node 560 operating in the NPN, that a distance between the first wireless device 510 and the at least one additional network node 510 is less than a threshold amount.

In a particular embodiment, the first cell is at least one public network macro cell.

In a particular embodiment, the non-public network comprises a SNPN or a PNI-NPN.

In a particular embodiment, the first wireless device 510 is attached to the PN.

In a particular embodiment, the first wireless device 510 is in an active state.

In a particular embodiment, the first wireless device 510 is in an idle state.

In a particular embodiment, the first network node 560 receives, from the first wireless device 510, at least one measurement on the second cell associated with the NPN. Determining that the first wireless device 510 in the first cell is proximate to the second cell associated with the NPN may include determining that the at least one measurement indicates that a signal level in the second cell is equal to or greater than a threshold value.

In a further particular embodiment, prior to receiving the at least one measurement from the first wireless device 510, the first network node 560 may transmit, to the first wireless device 510, a request for the at least one measurement associated with the second cell. In a further particular embodiment, the at least one measurement is received in response to a mobility event being detected by the first wireless device, and the first network node 560 may perform a handover the first wireless device 510 to the NPN or reject a handover of the first wireless device 510 to the NPN.

In a particular embodiment, the first network node 560 stores a location of the first wireless device when the first wireless device was offloaded to the third frequency band.

In a particular embodiment, the third frequency band is selected by the first wireless device from a plurality of frequency bands.

In a particular embodiment, after offloading the first wireless device 510, the first network node 560 stores location information associated with the first wireless device 510. The first network node 560 may use the location information associated with the first wireless device 510 as a proxy position for a second network node associated with the NPN and generate a NULL toward the first wireless device 510.

In a particular embodiment, after offloading the first wireless device 510, the first network node 560 stores location information associated with the first wireless device 510. The first network node 560 may use the location information associated with the first wireless device 510 as a proxy position for a second network node associated with the NPN and generate a NULL toward the second network node.

Figure 21:
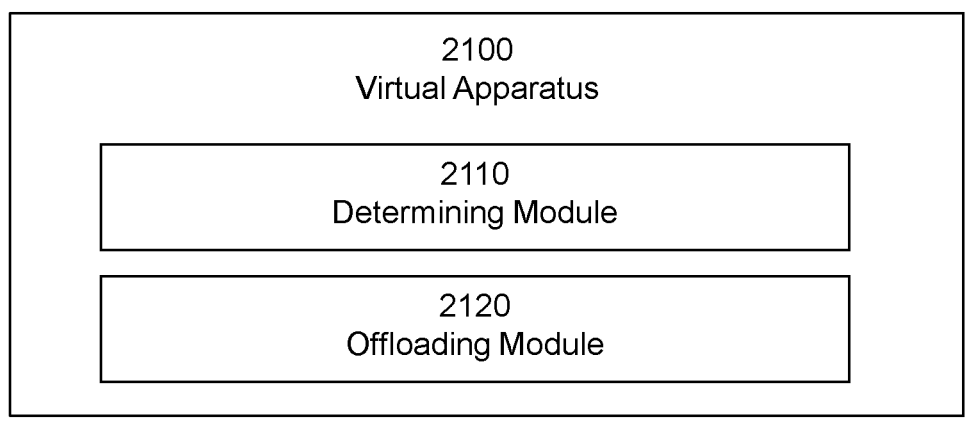
FIG. 21 illustrates another exemplary virtual computing device, according to certain embodiments.

FIG. 21 illustrates a schematic block diagram of a virtual apparatus 2100 in a wireless network (for example, the wireless network shown in FIG. 5). The apparatus may be implemented in a wireless device or network node (e.g., wireless device 510 or network node 560 shown in FIG. 5). Apparatus 2100 is operable to carry out the example method described with reference to FIG. 20 and possibly any other processes or methods disclosed herein. It is also to be understood that the method of FIG. 20 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 2110, offloading module 2120, and any other suitable units of apparatus 2100 to perform corresponding functions according one or more embodiments of the present disclosure.

According to certain embodiments, determining module 2110 may perform certain of the determining functions of the apparatus 2100. For example, determining module 2110 may determine that a first wireless device 510 operating on a first frequency band in the first cell is proximate to a second cell associated with a NPN operating on a second frequency band.

According to certain embodiments, offloading module 2120 may perform certain of the offloading functions of the apparatus 2100. For example, offloading module 2120 may offload the first wireless device 510 to a third frequency band.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 22:
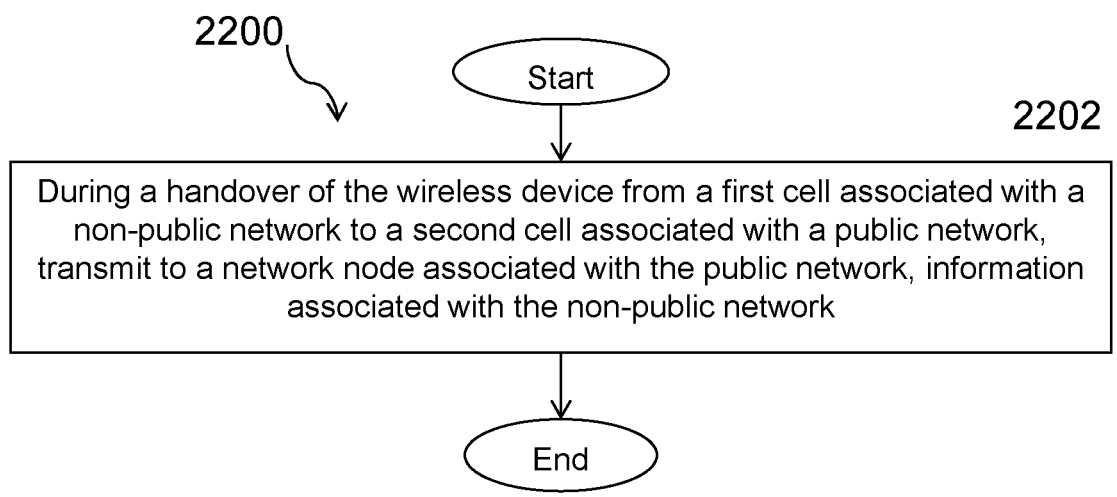
FIG. 22 illustrates another method by a wireless device, according to certain embodiments.

FIG. 22 depicts another method 2200 by a wireless device 510, according to certain embodiments. At step 2202, during a handover of the wireless device 510 from a first cell associated with a NPN to a second cell associated with a PN, the wireless device 510 transmits, to a network node 560 associated with the PM, information associated with the NPN.

In a particular embodiment, the information associated with the NPN comprises at least one of: a network identifier associated with the NPN, the first frequency band on which the NPN is operating; and a public land management network identifier associated with the NPN.

In a particular embodiment, the information is transmitted to the network node 560 in a RLF report.

In a particular embodiment, the wireless device 510 performs at least one measurement on the first cell associated with the NPN and transmits at least one measurement associated with the NPN to the network node 560.

In a particular embodiment, the at least one measurement associated with the NPN is transmitted to the network node 560 in response to receiving a request for the at least one measurement from the network node 560.

In a particular embodiment, the first cell associated with the NPN is operating on a first frequency band and the second cell associated with the PN is operating on a second frequency band.

In a further particular embodiment, the first frequency band is adjacent to the second frequency band.

In a further particular embodiment, at least a portion of the first frequency band overlaps with the second frequency band.

In a particular embodiment, at least a portion of the first cell associated with the NPN is proximate to or overlaps with the second cell associated with the PN.

In a particular embodiment, the at least a portion of the first cell is proximate to the second cell when a distance between the at least a portion of the first cell and the second cell is less than a threshold amount.

In a particular embodiment, the second cell is at least one public network macro cell.

In a particular embodiment, the non-public network comprises a SNPN or a PNI-NPN.

In a particular embodiment, the wireless device 510 is attached to the PN.

Figure 23:
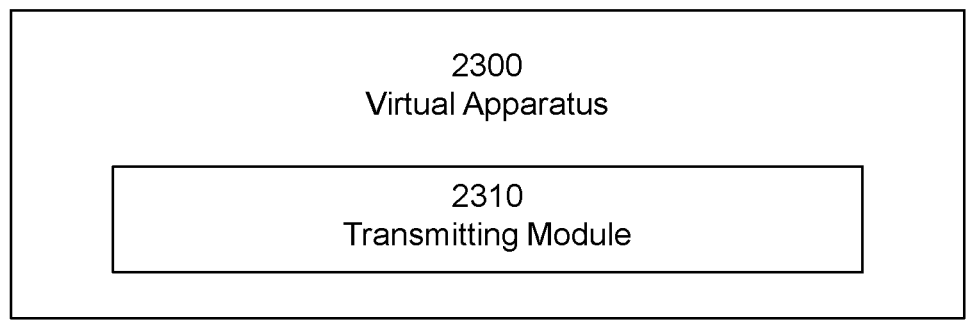
FIG. 23 illustrates another exemplary virtual computing device, according to certain embodiments.

FIG. 23 illustrates a schematic block diagram of a virtual apparatus 2300 in a wireless network (for example, the wireless network shown in FIG. 5). The apparatus may be implemented in a wireless device or network node (e.g., wireless device 510 or network node 560 shown in FIG. 5). Apparatus 2300 is operable to carry out the example method described with reference to FIG. 22 and possibly any other processes or methods disclosed herein. It is also to be understood that the method of FIG. 22 is not necessarily carried out solely by apparatus 2300. At least some operations of the method can be performed by one or more other entities.

Virtual Apparatus 2300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 2310 and any other suitable units of apparatus 2300 to perform corresponding functions according one or more embodiments of the present disclosure.

According to certain embodiments, transmitting module 2310 may perform certain of the transmitting functions of the apparatus 2300. For example, during a handover of the wireless device 510 from a first cell associated with a NPN to a second cell associated with a PN, transmitting module 2310 may transmit, to a network node 560 associated with the PN, information associated with the NPN.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a first network node associated with a public network in a first cell, the method comprising:
   determining that a first wireless device operating on a first frequency band in the first cell is proximate to a second cell associated with a non-public network operating on a second frequency band; and
   based on determining that the first wireless device is proximate to the second cell associated with the non-public network operating on the second frequency band, offloading the first wireless device to a third frequency band that is separated from the second frequency band by more than a threshold amount to create a virtual fence around the second cell associated with the non-public network operating on the second frequency band to prevent interference with the second frequency band.

2. The method of claim 1, wherein at least a portion of the first frequency band and the second frequency band include a shared band.

3. The method of claim 1, wherein the first frequency band is adjacent to the second frequency band.

4. The method of claim 1, further comprising determining that at least a portion of the first cell is proximate to or overlapping with the second cell associated with the non-public network.

5. The method of claim 4, wherein the at least a portion of the first cell is proximate to the second cell when a distance between the at least a portion of the first cell and the second cell is less than a threshold amount.

6. The method of claim 1, further comprising:
   receiving, from a second wireless device, first information associated with the non-public network, the first information comprising at least one of:

a network identifier associated with the non-public network, the second frequency band on which the non-public network is operating; and a public land management network identifier associated with the non-public network.

7. The method of claim 6, wherein the first information is received from the second wireless device during a handover of the second wireless device from the non-public network to the public network.

8. The method of claim 6, wherein the first information is received from the second wireless device in a Radio Link Failure, RLF, report.

9. The method of claim 6, further comprising sending, to the second wireless device, a request for at least one measurement associated with the second cell associated with the non-public network.

10. The method of claim 6, wherein the network node determines that the first wireless device is proximate the second cell associated with the non-public network based on at least one of the first information and the second information.

11. The method of claim 1, further comprising receiving second information from the non-public network, the second information comprising location information of at least one additional network node operating in the non-public network.

12. The method of claim 1, further comprising:
obtaining position information associated with the first wireless device, and wherein the network node determines that the first wireless device is proximate the second cell associated with the non-public network based on the position information associated with the first wireless device.

13. The method of claim 12 wherein determining that the first wireless device in the first cell is proximate to the second cell associated with the non-public network comprises:
determining, based on the position information associated with the first wireless device and location information of at least one additional network node operating in the non-public network, that a distance between the first wireless device and the at least one additional network node is less than a threshold amount.

14. The method of claim 1, wherein the first cell is at least one public network macro cell.

15. The method of claim 1, wherein the non-public network comprises a Standalone Non-Public Network, SNPN, or a Public Network Integrated Non Public Network, PNI-NPN.

16. The method of claim 1, wherein the first wireless device is attached to the public network.

17. The method of claim 1, wherein the first wireless device is in an active state.

18. The method of claim 1, wherein the first wireless device is in an idle state.

19. The method of claim 1, further comprising:
receiving, from the first wireless device, at least one measurement on the second cell associated with the non-public network; and wherein determining that the first wireless device in the first cell is proximate to the second cell associated with the non-public network comprises determining that the at least one measurement indicates that a signal level in the second cell is equal to or greater than a threshold value.

20. The method of claim 19, further comprising, prior to receiving the at least one measurement from the first wireless device, transmitting, to the first wireless device, a request for the at least one measurement associated with the second cell.

21. The method of claim 19, wherein the at least one measurement is received in response to a mobility event being detected by the first wireless device, and the method further comprises:
performing a handover the first wireless device to the non-public network; or
rejecting a handover of the first wireless device to the non-public network.

22. The method of claim 1, further comprising storing a location of the first wireless device when the first wireless device was offloaded to the third frequency band.

23. A first network node associated with a public network in a first cell comprises processing circuitry configured to perform the method of claim 1.

* * * * *